US010802677B2

(12) United States Patent
Reimann et al.

(10) Patent No.: US 10,802,677 B2
(45) Date of Patent: Oct. 13, 2020

(54) METHODS AND APPARATUS TO MANAGE ZONES OF A MULTI-ZONE MEDIA PLAYBACK SYSTEM

(71) Applicant: Sonos, Inc, Santa Barbara, CA (US)

(72) Inventors: Robert M. Reimann, Newton, MA (US); Joni R. Hoadley, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 17 days.

(21) Appl. No.: 16/275,312

(22) Filed: Feb. 13, 2019

(65) Prior Publication Data
US 2019/0179496 A1 Jun. 13, 2019

Related U.S. Application Data

(63) Continuation of application No. 15/139,325, filed on Apr. 27, 2016, now Pat. No. 10,228,823, which is a
(Continued)

(51) Int. Cl.
*G06F 3/0482* (2013.01)
*G06F 16/44* (2019.01)
(Continued)

(52) U.S. Cl.
CPC .......... *G06F 3/0482* (2013.01); *G06F 3/0486* (2013.01); *G06F 3/04817* (2013.01); *G06F 3/04842* (2013.01); *G06F 3/04847* (2013.01); *G06F 3/04883* (2013.01); *G06F 3/165* (2013.01); *G06F 16/44* (2019.01);
(Continued)

(58) Field of Classification Search
None
See application file for complete search history.

(56) References Cited

U.S. PATENT DOCUMENTS

| 5,182,552 A | 1/1993 | Paynting |
| 5,239,458 A | 8/1993 | Suzuki |

(Continued)

FOREIGN PATENT DOCUMENTS

| EP | 1389853 A1 | 2/2004 |
| JP | H09186984 A | 7/1997 |

(Continued)

OTHER PUBLICATIONS

Yamaha DME Designer 3.5 User Manual; Copyright 2004, 507 pages.
(Continued)

*Primary Examiner* — Tuan S Nguyen
(74) *Attorney, Agent, or Firm* — McDonnell Boehnen Hulbert & Berghoff LLP

(57) ABSTRACT

Some embodiments of the disclosed systems and methods include displaying a graphical user interface comprising a first section and a second section, wherein the first section includes a first media icon corresponding to a first media item, and wherein the second section includes a first zone icon corresponding to a first zone comprising a first set of one or more playback devices; and in response to detecting a drag of the first media icon to the first zone icon, instructing at least one playback device in the first set of one or more playback devices to play the first media item corresponding to the first media icon.

16 Claims, 14 Drawing Sheets

Related U.S. Application Data continuation of application No. 14/852,180, filed on Sep. 11, 2015, now Pat. No. 9,395,877, which is a continuation of application No. 13/932,867, filed on Jul. 1, 2013, now Pat. No. 9,223,491, which is a continuation of application No. 13/247,754, filed on Sep. 28, 2011, now Pat. No. 9,052,810.

(51) Int. Cl.

| | |
|---|---|
| *G08C 17/02* | (2006.01) |
| *G08C 23/04* | (2006.01) |
| *G11B 19/02* | (2006.01) |
| *G06F 3/0486* | (2013.01) |
| *G06F 3/0481* | (2013.01) |
| *G06F 3/0484* | (2013.01) |
| *G06F 3/16* | (2006.01) |
| *G06F 3/0488* | (2013.01) |

(52) U.S. Cl.
CPC ............. *G08C 17/02* (2013.01); *G08C 23/04* (2013.01); *G11B 19/025* (2013.01)

(56) References Cited

U.S. PATENT DOCUMENTS

| | | | |
|---|---|---|---|
| 5,299,266 | A | 3/1994 | Lumsden |
| 5,406,634 | A | 4/1995 | Anderson et al. |
| 5,440,644 | A | 8/1995 | Farinelli et al. |
| 5,751,819 | A | 5/1998 | Dorrough |
| 5,761,320 | A | 6/1998 | Farinelli et al. |
| 5,821,937 | A | 10/1998 | Tonelli et al. |
| 5,831,616 | A | 11/1998 | Lee |
| 5,838,384 | A | 11/1998 | Schindler et al. |
| 5,923,902 | A | 7/1999 | Inagaki |
| 6,026,150 | A | 2/2000 | Frank et al. |
| 6,032,202 | A | 2/2000 | Lea et al. |
| 6,256,554 | B1 | 7/2001 | DiLorenzo |
| 6,330,005 | B1 | 12/2001 | Tonelli et al. |
| 6,404,811 | B1 | 6/2002 | Cvetko et al. |
| 6,430,353 | B1 | 8/2002 | Honda et al. |
| 6,469,633 | B1 | 10/2002 | Wachter et al. |
| 6,480,889 | B1 | 11/2002 | Saito et al. |
| 6,487,296 | B1 | 11/2002 | Allen et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,728,531 | B1 | 4/2004 | Lee et al. |
| 6,757,517 | B2 | 6/2004 | Chang et al. |
| 6,778,869 | B2 | 8/2004 | Champion |
| 6,826,283 | B1 | 11/2004 | Wheeler et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,218,708 | B2 | 5/2007 | Berezowski et al. |
| 7,236,773 | B2 | 6/2007 | Thomas |
| 7,295,548 | B2 | 11/2007 | Blank et al. |
| 7,312,785 | B2 | 12/2007 | Tsuk et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,668,990 | B2 | 2/2010 | Krzyzanowski et al. |
| 7,742,740 | B2 | 6/2010 | Goldberg et al. |
| 7,853,341 | B2 | 12/2010 | McCarty et al. |
| 7,904,069 | B2 | 3/2011 | Rye et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,050,203 | B2 | 11/2011 | Jacobsen et al. |
| 8,050,652 | B2 | 11/2011 | Qureshey et al. |
| 8,103,009 | B2 | 1/2012 | McCarty et al. |
| 8,131,390 | B2 | 3/2012 | Braithwaite et al. |
| 8,234,395 | B2 | 7/2012 | Millington et al. |
| 8,290,603 | B1 | 10/2012 | Lambourne et al. |
| 8,423,893 | B2 | 4/2013 | Ramsay et al. |
| 8,483,853 | B1 | 7/2013 | Lambourne et al. |
| 8,588,949 | B2 | 11/2013 | Lambourne et al. |
| 8,762,565 | B2 | 6/2014 | Togashi et al. |
| 8,965,544 | B2 | 2/2015 | Ramsay |
| 9,015,612 | B2 | 4/2015 | Nguyen et al. |
| 9,164,532 | B2 | 10/2015 | Millington |
| 2001/0042107 | A1 | 11/2001 | Palm |
| 2002/0003548 | A1 | 1/2002 | Krusche et al. |
| 2002/0022453 | A1 | 2/2002 | Balog et al. |
| 2002/0026442 | A1 | 2/2002 | Lipscomb et al. |
| 2002/0109710 | A1 | 8/2002 | Holtz et al. |
| 2002/0124097 | A1 | 9/2002 | Isely et al. |
| 2002/0165921 | A1 | 11/2002 | Sapieyevski |
| 2002/0188762 | A1 | 12/2002 | Tomassetti et al. |
| 2003/0020763 | A1 | 1/2003 | Mayer et al. |
| 2003/0023741 | A1 | 1/2003 | Tomassetti et al. |
| 2003/0157951 | A1 | 8/2003 | Hasty |
| 2003/0210796 | A1 | 11/2003 | McCarty et al. |
| 2004/0008852 | A1 | 1/2004 | Also et al. |
| 2004/0010727 | A1 | 1/2004 | Fujinami |
| 2004/0015252 | A1 | 1/2004 | Aiso et al. |
| 2004/0024478 | A1 | 2/2004 | Hans et al. |
| 2004/0131192 | A1 | 7/2004 | Metcalf |
| 2005/0028221 | A1 | 2/2005 | Liu et al. |
| 2005/0047605 | A1 | 3/2005 | Lee et al. |
| 2005/0289224 | A1 | 12/2005 | Deslippe et al. |
| 2006/0239131 | A1 | 10/2006 | Nathan et al. |
| 2007/0038999 | A1 | 2/2007 | Millington et al. |
| 2007/0142022 | A1 | 6/2007 | Madonna et al. |
| 2007/0142944 | A1 | 6/2007 | Goldberg et al. |
| 2007/0232362 | A1 | 10/2007 | Kim et al. |
| 2008/0045222 | A1 | 2/2008 | Mountney et al. |
| 2008/0218309 | A1 | 9/2008 | Steenstra et al. |
| 2009/0113009 | A1 | 4/2009 | Slemmer et al. |
| 2009/0228919 | A1 | 9/2009 | Zott et al. |
| 2010/0131848 | A1 | 5/2010 | Friedlander et al. |
| 2010/0131978 | A1* | 5/2010 | Friedlander ......... H04L 12/2812 725/37 |
| 2010/0231790 | A1 | 9/2010 | Ansari et al. |
| 2010/0299639 | A1* | 11/2010 | Ramsay ................. H04R 27/00 715/835 |
| 2010/0318917 | A1 | 12/2010 | Holladay et al. |
| 2011/0119611 | A1 | 5/2011 | Ahn et al. |
| 2013/0076651 | A1 | 3/2013 | Reimann et al. |
| 2013/0251174 | A1 | 9/2013 | Lambourne |

FOREIGN PATENT DOCUMENTS

| | | |
|---|---|---|
| JP | 2002199474 A | 7/2002 |
| JP | 2004129154 A | 4/2004 |
| JP | 2005339174 A | 12/2005 |
| JP | 2007512718 A | 5/2007 |
| KR | 100833862 B1 | 6/2008 |
| WO | 200153994 | 7/2001 |
| WO | 2003093950 A2 | 11/2003 |
| WO | 2005013047 A2 | 2/2005 |
| WO | 2009086599 A1 | 7/2009 |

OTHER PUBLICATIONS

Yamaha DME Designer 3.5 setup manual guide; copyright 2004, 16 pages.
Yamaha DME 64 Owner's Manual; copyright 2004, 80 pages.
Yamaha DME 32 manual: copyright 2001.
UPnP; "Universal Plug and Play Device Architecture," Jun. 8, 2000; version 1.0; Microsoft Corporation; pp. 1-54.
United States Patent and Trademark Office, U.S. Appl. No. 60/825,407, filed Sep. 12, 2006, entitled "Controlling and manipulating groupings in a multi-zone music or media system," 82 pages.
United States Patent and Trademark Office, U.S. Appl. No. 60/490,768, filed Jul. 28, 2003, entitled "Method for synchronizing audio playback between multiple networked devices," 13 pages.
Supplemental Notice of Allowability dated Nov. 25, 2015, issued in connection with U.S. Appl. No. 13/932,867, filed Jul. 1, 2013, 8 pages.

(56) References Cited

OTHER PUBLICATIONS

Supplemental Notice of Allowance dated May 1, 2015, issued in connection with U.S. Appl. No. 13/247,754, filed Sep. 28, 2011, 6 pages.
Supplemental Notice of Allowance dated Oct. 27, 2015, issued in connection with U.S. Appl. No. 13/915,238, filed Jun. 11, 2013, 2 pages.
PRISMIQ, Inc., "PRISMIQ Media Player User Guide," 2003, 44 pages.
Presentations at WinHEC 2000, May 2000, 138 pages.
Polycom Conference Composer User Guide, copyright 2001, 29 pages.
Palm, Inc., "Handbook for the Palm VII Handheld," May 2000, 311 pages.
Notice of Allowance dated Mar. 30, 2016, issued in connection with U.S. Appl. No. 14/852,208, filed Sep. 11, 2015, 9 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26,9 1999, 1068 pages.
Bluetooth. "Specification of the Bluetooth System: Wireless connections made easy," Core, Version 1.0 B, Dec. 1, 1999, 1076 pages.
Chinese Patent Office, Office Action dated Feb. 24, 2017, issued in connection with Chinese Application No. 201280058231.7, 4 pages.
Chinese Patent Office, Office Action Summary dated Jun. 15, 2016, issued in connection with Chinese Patent Application No. 201280058231.7, 20 pages.
Chinese Patent Office, Third Office Action dated Sep. 18, 2017, issued in connection with Chinese Application No. 201280058231.7, 7 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Search Report dated May 30, 2018, issued in connection with European Application No. 18154026.1, 8 pages.
European Patent Office, Extended European Search Report dated Aug. 19, 2016, issued in connection with European patent application No. 16163437.3, 7 pages.
Final Office Action dated Dec. 17, 2014, issued in connection with U.S. Appl. No. 13/247,754, filed Sep. 28, 2011, 12 pages.
International Bureau, International Preliminary Report on Patentability dated Apr. 10, 2014, issued in connection with International Application No. PCT/US2012/057553, filed Sep. 27, 2012, 8 pages.
International Searching Authority, International Search Report and Written Opinion dated Jan. 29, 2013, issued in connection with International Application No. PCT/US2012/057553, filed Sep. 27, 2012, 10 pages.
Japanese Patent Office, Office Action dated Mar. 1, 2016, issued in connection with Japanese Patent Application No. JP2014-53318, 7 pages.
Japanese Patent Office, Office Action dated May 30, 2017, issued in connection with Japanese Application No. 2016-106621, 5 pages.
Japanese Patent Office, Office Action Summary dated Mar. 1, 2016, issued in connection with Japanese Patent Application No. 2014-533318, 5 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Mills David L., "Network Time Protocol (Version 3) Specification, Implementation and Analysis," Network Working Group, Mar. 1992, 7 pages.
Motorola, "Simplefi, Wireless Digital Audio Receiver, Installation and User Guide," Dec. 31, 2001, 111 pages.
Non-Final Office Action dated Apr. 25, 2014, issued in connection with U.S. Appl. No. 13/247,754, filed Sep. 28, 2011, 10 pages.
Non-Final Office Action dated Dec. 3, 2015, issued in connection with U.S. Appl. No. 14/852,208, filed Sep. 11, 2015, 6 pages.
Non-Final Office Action dated Dec. 4, 2015, issued in connection with U.S. Appl. No. 14/852,223, filed Sep. 11, 2015, 6 pages.
Non-Final Office Action dated Jul. 6, 2015, issued in connection with U.S. Appl. No. 13/932,867, filed Jul. 1, 2013, 6 pages.
Non-Final Office Action dated Dec. 7, 2015, issued in connection with U.S. Appl. No. 14/852,180, filed Sep. 11, 2015, 6 pages.
Non-Final Office Action dated Mar. 17, 2015, issued in connection with U.S. Appl. No. 13/915,238, filed Jun. 11, 2013, 10 pages.
Notice of Allowance dated Oct. 8, 2015, issued in connection with U.S. Appl. No. 13/915,238, filed Jun. 11, 2013, 9 pages.
Notice of Allowance dated Aug. 17, 2015, issued in connection with U.S. Appl. No. 13/932,867, filed Jul. 1, 2013, 9 pages.
Notice of Allowance dated Mar. 23, 2015, issued in connection with U.S. Appl. No. 13/247,754, filed Sep. 28, 2011, 9 pages.
Notice of Allowance dated Oct. 24, 2018, issued in connection with U.S. Appl. No. 15/139,325, filed Apr. 27, 2016, 8 pages.
Notice of Allowance dated Mar. 25, 2016, issued in connection with U.S. Appl. No. 14/852,180, filed Sep. 11, 2015, 9 pages.
Notice of Allowance dated Mar. 25, 2016, issued in connection with U.S. Appl. No. 14/852,223, filed Sep. 11, 2015, 9 pages.

* cited by examiner

METHODS AND APPARATUS TO MANAGE ZONES OF A MULTI-ZONE MEDIA PLAYBACK SYSTEM

CROSS-REFERENCE TO RELATED APPLICATIONS

This application is a continuation of U.S. application Ser. No. 15/139,325, titled "Ungrouping Zones," filed on Apr. 27, 2016, and currently pending; U.S. application Ser. No. 15/139,325 is a continuation of U.S. application Ser. No. 14/852,180, titled "Grouping Zones," filed on Sep. 11, 2015, and issued on Jul. 19, 2016, as U.S. Pat. No. 9,395,877; U.S. application Ser. No. 14/852,180 is a continuation of U.S. application Ser. No. 13/932,867, titled "Methods and apparatus to manage zones of a multi-zone media playback system," filed on Jul. 1, 2013, and issued on Dec. 29, 2015, as U.S. Pat. No. 9,223,491; U.S. application Ser. No. 13/932,867 is a continuation of U.S. application Ser. No. 13/247,754, titled, "Methods and apparatus to manage zones of a multi-zone media playback system," filed Sep. 28, 2011, and issued Jun. 9, 2015, as U.S. Pat. No. 9,052,810. The entire contents of U.S. application Ser. No. 15/139,325, U.S. application Ser. No. 14/852,180, U.S. application Ser. No. 13/932,867, and U.S. Ser. No. 13/247,754 are incorporated herein by reference.

FIELD OF THE DISCLOSURE

The disclosure is related to consumer electronics and, more particularly, to methods and apparatus to manage zones of a multi-zone media playback system.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content. Demand for such audio and video content continues to surge. Given the high demand, technology used to access and play such content has likewise improved.

BRIEF DESCRIPTION OF THE DRAWINGS

Features, aspects, and advantages of the presently disclosed technology are better understood with regard to the following description, appended claims, and accompanying drawings where:

Figure 1:
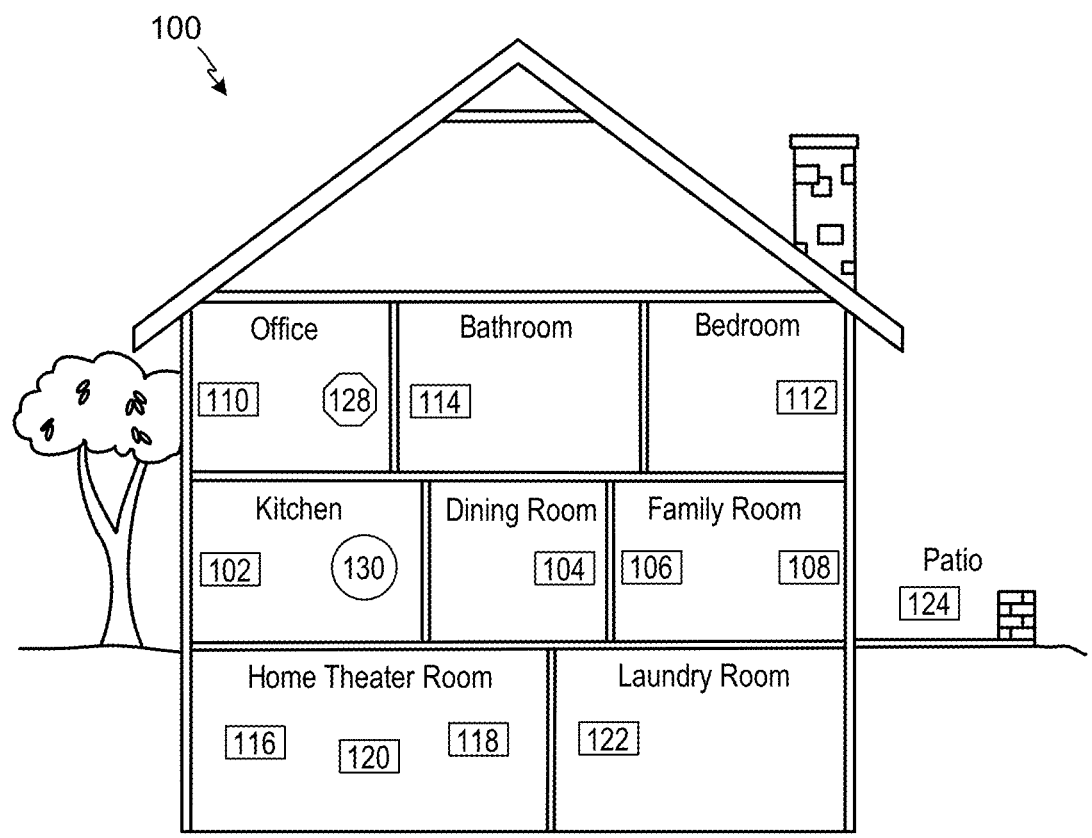
FIG. 1 shows an illustration of an example system in which embodiments of the methods and apparatus disclosed herein may be implemented.

In addition, the drawings are for the purpose of illustrating example embodiments, but it is understood that the present disclosure is not limited to the arrangements and instrumentality shown in the drawings.

DETAILED DESCRIPTION

I. Overview

Embodiments of the methods and apparatus disclosed herein enable a user to easily and conveniently manage zones of a multi-zone media playback system.

An example embodiment of an apparatus implemented in accordance with the present disclosure includes a user interface; a controller to configure one or more zone groups each associated with one or more media playback devices; a detector to monitor the user interface for a drag of an icon representative of a first one of the zone groups on the user interface from a first position to a second position; and a configuration implementer to change a configuration of the one or more zone groups in response to a detected drag of the icon.

In some embodiments, the configuration implementer is to change the configuration of the one or more zone groups by, when the second position corresponds to a second one of the zone groups, adding each zone of the first zone group to the second zone group.

In some embodiments, the detector is to monitor the user interface for a drag of a second icon representative of a first zone of the first zone group on the user interface from a third position to a fourth position.

In some embodiments, the configuration implementer is to change the configuration of the one or more zone groups by, when the fourth position corresponds to a second one of the zone groups, adding the first the first zone to the second zone group.

In some embodiments, the configuration implementer is to change the configuration of the one or more zone groups by, when the fourth position corresponds to an empty space, creating a new zone group that includes the first zone.

In some embodiments, the detector is to monitor the user interface for a drag of a second icon representative of a media item being playing in the first zone group from a third position to a fourth position.

In some embodiments, the configuration implementer is to change the configuration of the one or more zone groups by, when the fourth position corresponds to a second one of the zone groups, facilitating a presentation of the media item on a playback device associated with the second zone group.

An example method implemented in accordance with the present disclosure includes monitoring a designated area of a user interface for a drag of an icon representative of a first one of one or more zone groups on the user interface from a first position to a second position, the one or more zone groups each associated with one or more media playback devices; and changing a configuration of the one or more zone groups in response to a detected drag of the icon.

In some embodiments, changing the configuration of the one or more zone groups comprises. when the second position corresponds to a second one of the zone groups, adding each zone of the first zone group to the second zone group.

In some embodiments, the method further comprises monitoring the user interface for a drag of a second icon representative of a first zone of the first zone group on the user interface from a third position to a fourth position.

In some embodiments, changing the configuration of the one or more zone groups comprises, when the fourth position corresponds to a second one of the zone groups, adding the first the first zone to the second zone group.

In some embodiments, changing the configuration of the one or more zone groups comprises, when the fourth position corresponds to an empty space, creating a new zone group that includes the first zone.

In some embodiments, the method further comprises monitoring the user interface for a drag of a second icon representative of a media item being playing in the first zone group from a third position to a fourth position.

In some embodiments, changing the configuration of the one or more zone groups comprises, when the fourth position corresponds to a second one of the zone groups, facilitating a presentation of the media item on a playback device associated with the second zone group.

An example tangible machine-readable medium has instructions stored thereon implemented in accordance with the present disclosure that cause a machine to at least monitor a designated area of a user interface for a drag of an icon representative of a first one of one or more zone groups on the user interface from a first position to a second position, the one or more zone groups each associated with one or more media playback devices; and change a configuration of the one or more zone groups in response to a detected drag of the icon.

In some embodiments, the instructions are to cause the machine to change the configuration of the one or more zones by, when the second position corresponds to a second one of the zone groups, adding each zone of the first zone group to the second zone group.

In some embodiments, the instructions are to cause the machine to monitor the user interface for a drag of a second icon representative of a first zone of the first zone group on the user interface from a third position to a fourth position.

In some embodiments, the instructions are to cause the machine to change the configuration of the one or more zone groups by, when the fourth position corresponds to a second one of the zone groups, adding the first the first zone to the second zone group.

In some embodiments, the instructions are to cause the machine to change the configuration of the one or more zone groups by, when the fourth position corresponds to an empty space, creating a new zone group that includes the first zone.

In some embodiments, the instructions are to cause the machine to monitor the user interface for a drag of a second icon representative of a media item being playing in the first zone group from a third position to a fourth position.

In some embodiments, the instructions are to cause the machine to change the configuration of the one or more zone groups by, when the fourth position corresponds to a second one of the zone groups, facilitating a presentation of the media item on a playback device associated with the second zone group.

Although the following discloses example methods, apparatus, systems, and articles of manufacture including, among other components, firmware and/or software executed on hardware, it should be noted that such methods, apparatus, systems, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

When any of the appended claims are read to cover a purely software and/or firmware implementation, at least one of the elements in at least one example is hereby expressly defined to include a tangible medium such as a memory, DVD, CD, Blu-ray, etc., storing the software and/or firmware.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure may be practiced without certain, specific details. In other instances, well known methods, procedures, components, and circuitry have not been described in detail to avoid unnecessarily obscuring aspects of the embodiments.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, may be combined with other embodiments.

II. Example Environment

Referring now to the drawings, in which like numerals may refer to like parts throughout the figures, FIG. 1 shows an example system configuration 100 in which one or more of the method and/or apparatus disclosed herein may be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone may cover more than one room or space. One or more of zone players 102-124 are shown in each respective zone. A zone player 102-124, also referred to as a playback device, multimedia unit, speaker, etc., provides audio, video, and/or audiovisual output. A controller 130 (e.g., shown in the kitchen for purposes of illustration) provides control to the system configuration 100. The system configuration 100 illustrates an example whole house audio system, though it is understood that the technology described herein is not limited to its particular place of application or to an expansive system like a whole house audio system 100 of FIG. 1.

Figure 2A:
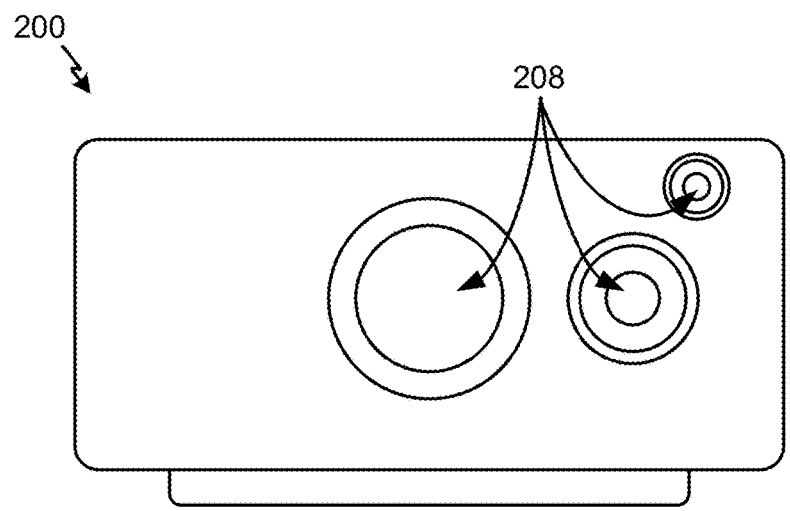
FIG. 2A shows an illustration of an example zone player having a built-in amplifier and speakers.
Figure 2B:
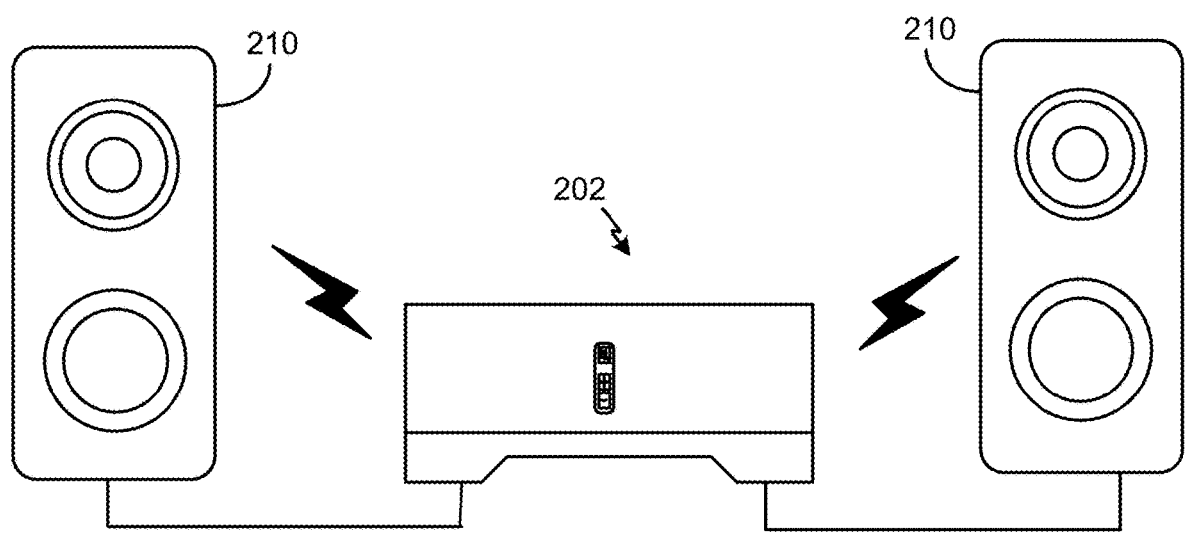
FIG. 2B shows an illustration of an example zone player having a built-in amplifier and connected to external speakers.
Figure 2C:
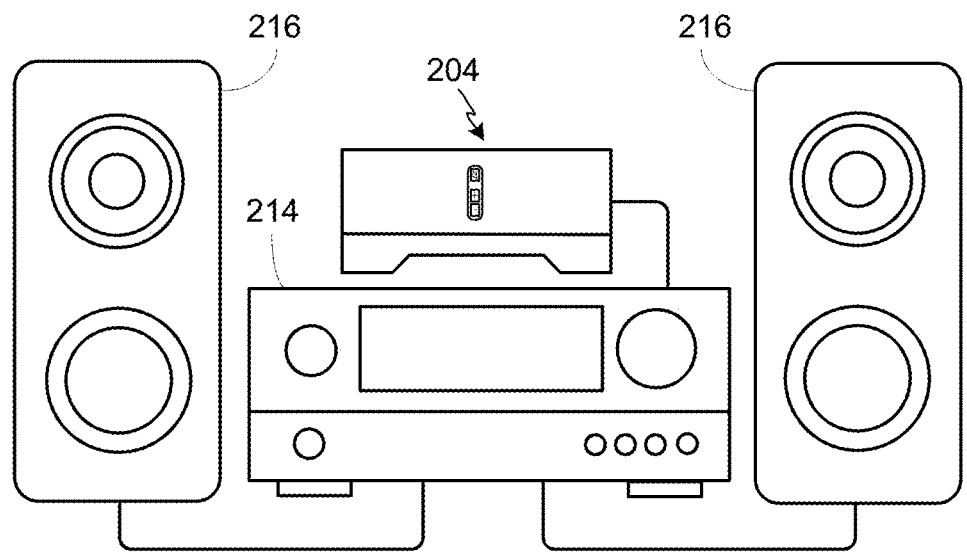
FIG. 2C shows an illustration of an example zone player connected to an A/V receiver and speakers.

FIGS. 2A, 2B, and 2C show example illustrations of zone players 200-204. The zone players 200-204 of FIGS. 2A, 2B, and 2C, respectively, may correspond to any of the zone players 102-124 of FIG. 1. While certain embodiments provide multiple zone players, an audio output may be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter, a mid-range driver, and/or a subwoofer. In certain embodiments, the zone player 200 of FIG. 2A may be configured to play stereophonic audio or monaural audio. As described in greater detail below, in some embodiments, the example zone player 200 of FIG. 2A can also transmit a second signal to, for example, other zone player(s) in the same or different zone(s), speaker(s), receiver(s), etc. Transmission of the second signal may be part of, for example, a system in which multiple zone players, speakers, receivers, etc. form a network to, for example, present media content in a synchronization or distributed manner.

The example zone player 202 of FIG. 2B includes a built-in amplifier (not shown in this illustration) to power a set of detached speakers 210. The speakers 210 of FIG. 2B may include, for example, any type of loudspeaker. The zone player 202 of FIG. 2B can communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 can transmit a second signal to, for example, other zone player(s) in the same or different zone(s), speaker(s), receiver(s), etc.

The example zone player 204 of FIG. 2C does not include an amplifier, but allows a receiver 214, or another audio and/or video type device with built-in amplification, to connect to a data network 128 of FIG. 1 and to play audio received over the data network 128 via the receiver 214 and a set of detached speakers 216. In addition to the wired couplings shown in FIG. 2C, the detached speakers 216 can receive audio content via a wireless communication channel between the detached speakers 216 and, for example, the zone player 204 and/or the receiver 214. In some embodiments the zone player 202 can transmit a second signal to, for example, other zone player(s) in the same or different zone(s), speaker(s), receiver(s), etc.

Example zone players include "Sonos® Play:3," "Sonos Play:5," "Sonos Connect," and "Sonos Connect:Amp," which are offered by Sonos, Inc. of Santa Barbara, Calif. A zone player may also be referred to herein as a playback device, and a zone player is not limited to the particular examples illustrated in FIGS. 2A, 2B, and 2C. For example, a zone player may include a wired or wireless headphone. In another example, a zone player might include a subwoofer. In an example, a zone player may include or interact with a docking station for an Apple iPod™ or similar device. In some embodiments, a zone player may relay one or more signals received from, for example, a first zone player to another playback device. In some embodiments, a zone player may receive a first signal and generate an output corresponding to the first signal and, simultaneously or separately, may receive a second signal and transmit or relay the second signal to another zone player(s), speaker(s), receiver(s), etc. Thus, an example zone player described herein can act as a playback device and, at the same time, operate as a hub in a network of zone players. In such instances, media content corresponding to the first signal may be different from the media content corresponding to the second signal.

Figure 3:
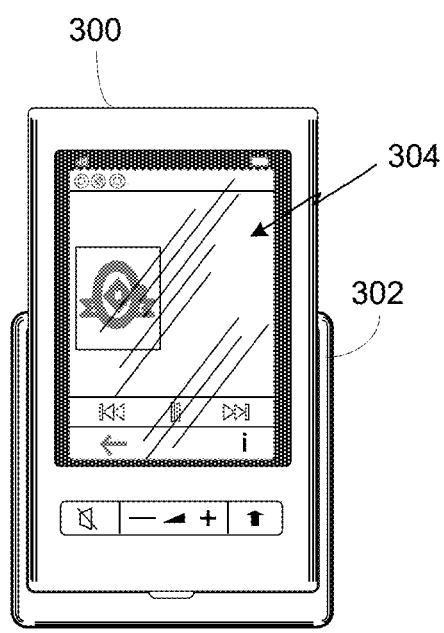
FIG. 3 shows an illustration of an example controller.

FIG. 3 shows an example illustration of a wireless controller 300 in a docking station 302. The controller 300 may correspond to the controlling device 130 of FIG. 1. The controller 300 is provided with a touch screen 304 that allows a user to interact with the controller 300 to, for example, retrieve and navigate a playlist of audio items, control operations of one or more zone players, and provide overall control of the system configuration 100. In certain embodiments, any number of controllers may be used to control the system configuration 100. In certain embodiments, there may be a limit on the number of controllers that can control the system configuration 100. The controllers might be wireless like wireless controller 300 or wired to the data network 128. Furthermore, an application running on any network-enabled portable devices, such as an iPhone™, iPad™, Android™ powered phone, or any other smart phone or network-enabled device may be used as a controller by connecting to the data network 128. An application running on a laptop or desktop PC or Mac may also be used as a controller. Example controllers include a "Sonos® Controller 200," "Sonos® Controller for iPhone," "Sonos® Controller for iPad," "Sonos® Controller for Android, Sonos® Controller for Mac or PC," which are offered by Sonos, Inc. of Santa Barbara, Calif. The flexibility of such an application and its ability to be ported to a new type of portable device is advantageous.

Referring back to the system configuration 100 of FIG. 1, a particular zone may contain one or more zone players. For example, the family room of FIG. 1 contains two zone players 106 and 108, while the kitchen is shown with one zone player 102. Zones may be dynamically configured by positioning a zone player in a room or space and assigning via the controller 130 the zone player to a new or existing zone. As such, zones may be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network may be distributed in and around the system configuration 100.

Particularly, the data network 128 may be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 may further allow access to a wide area network, such as the Internet.

In certain embodiments, the data network 128 may be created by connecting any of the zone players 102-124, or some other connecting device, to a broadband router. Other zone players 102-124 may then be added wired or wirelessly to the data network 128. For example, a zone player (e.g., any of zone players 102-124) may be added to the system configuration 100 by simply pressing a button on the zone player itself, which enables a connection to be made to the data network 128. The broadband router may be connected to an Internet Service Provider (ISP), for example. The broadband router may be used to form another data network within the system configuration 100, which may be used in other applications (e.g., web surfing). The data network 128 may also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones may be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone may be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 may be configured to play the same audio source in synchrony, or the two zone players 106 and 108 may be paired to play two separate sounds in left and right channels, for example. In other words, the stereo effects of a sound may be reproduced or enhanced through the two zone players 106 and 108, one for the left sound and the other for the right sound. In certain embodiments, paired zone players may play audio in synchrony with other zone players.

In certain embodiments, three or more zone players may be configured to play various channels of audio that is encoded with three channels or more sound. For example, the home theater room shows zone players 116, 118, and 120. If the sound is encoded as 2.1 channel audio, then the zone player 116 may be configured to play left channel audio, the zone player 118 may be configured to play right channel audio, and the zone player 120 may be configured to play bass frequencies. Other configurations are possible and depend on the number of zone players and the type of audio. Further, a particular zone may be configured to play a 5.1 channel audio in one instance, such as when playing audio from a movie, and then dynamically switch to play stereo, such as when playing audio from a two channel source.

In certain embodiments, two or more zone players may be sonically consolidated to form a single, consolidated zone player. A consolidated zone player (though made up of multiple, separate devices) may be configured to process and reproduce sound differently than an unconsolidated zone player or zone players that are paired, because a consolidated zone player will have additional speaker drivers from which sound may be passed. The consolidated zone player may further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) may be accessed via the data network 128 and played. Internet radio stations, shows, and podcasts may be accessed via the data network 128. Music services that let a user stream and download music and audio content may be accessed via the data network 128. Further, music may be obtained from traditional sources, such as a turntable or CD player, via a line-in connection to a zone player, for example. Audio content may also be accessed through AirPlay™ wireless technology by Apple, Inc., for example. Audio content received from one or more sources may be shared amongst the zone players 102 to 124 via the data network 128 and/or the controller 130.

III. Example Playback Device

Figure 4:
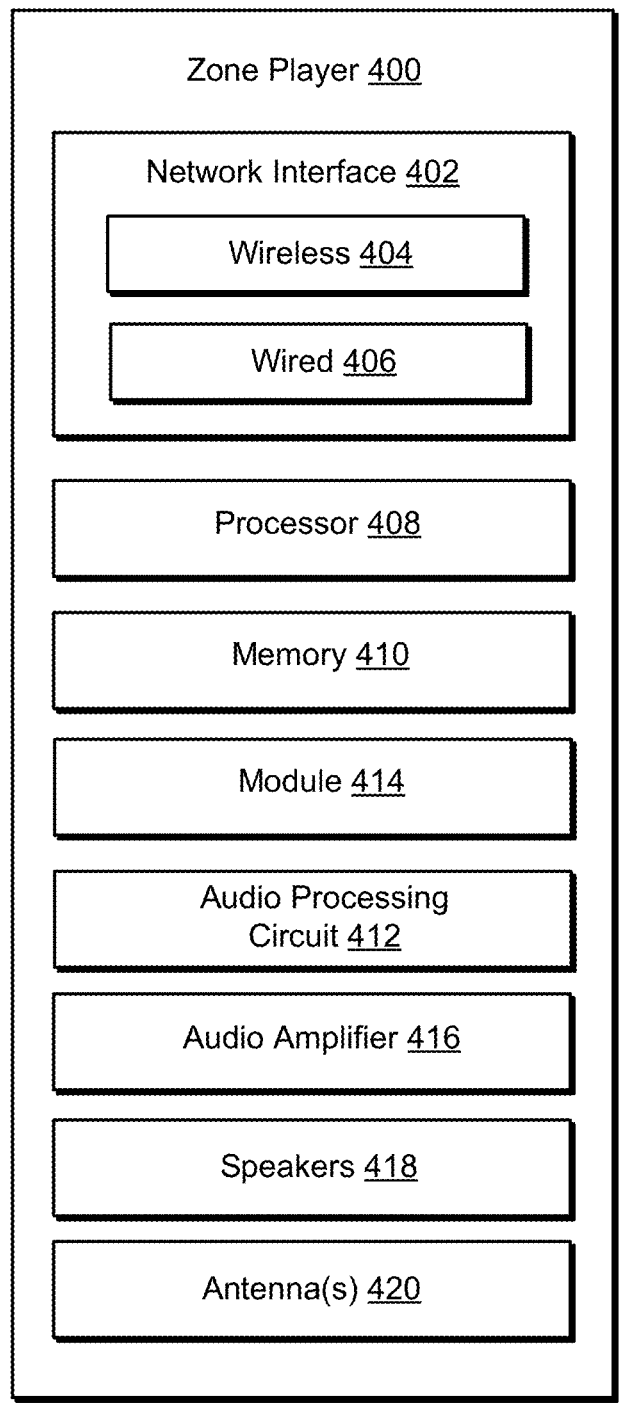
FIG. 4 shows an internal functional block diagram of an example zone player.

Referring now to FIG. 4, there is shown an example functional block diagram of a zone player 400 in accordance with an embodiment. The zone player 400 of FIG. 4 includes a network interface 402, a processor 408, a memory 410, an audio processing component 412, a module 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 may be integrated into another component. For example, the zone player 400 could be constructed as part of a lamp for indoor or outdoor use.

Referring back to FIG. 4, the network interface 402 facilitates a data flow between zone players and other devices on a data network (e.g., the data network 128 of FIG. 1) and the zone player 400. In some embodiments, the network interface 402 may manage the assembling of an audio source or file into smaller packets that are to be transmitted over the data network or reassembles received packets into the original source or file. In some embodiments, the network interface 402 may further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 may include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, etc.) in accordance with a communication protocol (e.g., any of the wireless standards IEEE 802.11a, 802.11b, 802.11g, 802.11n, or 802.15). To receive wireless signals and to provide the wireless signals to the wireless interface 404 and to transmit wireless signals, the zone player 400 of FIG. 4 includes one or more antennas 420. The antenna(s) 420 are discussed in greater detail below in connection with FIGS. 6A and 6B. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that may be loaded with one or more software modules 414, which can be executed by the processor 408 to achieve certain tasks. In the illustrated embodiment, the memory 410 is a tangible machine readable medium storing instructions that can be executed by the processor 408. In some embodiments, a task might be for the zone player 400 to retrieve audio data from another zone player or a device on a network. In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks may be achieved via the one or more software modules 414 and the processor 408.

The audio processing component 412 may include one or more digital-to-analog converters (DAC), an audio preprocessing component, an audio enhancement component or a digital signal processor, and so on. In certain embodiments, the audio that is retrieved via the network interface 402 is processed and/or intentionally altered by the audio processing component 210. Further, the audio processing component 412 may produce analog audio signals. The processed analog audio signals are then provided to the audio amplifier 416 for play back through speakers 418. In addition, the audio processing component 412 may include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device that amplifies audio signals to a level for driving one or more speakers 418. The one or more speakers 418 may include an individual transducer (e.g., a "driver") or a complete speaker system that includes an enclosure including one or more drivers. A particular driver may be a subwoofer (for low frequencies), a mid-range driver (middle frequencies), and a tweeter (high frequencies), for example. An enclosure may be sealed or ported, for example.

A zone player 400 may also be referred to herein as a playback device. An example playback device includes a Sonos® S5, which is manufactured by Sonos, Inc. of Santa Barbara, Calif. The S5 is an example zone player with a built-in amplifier and speakers. In particular, the S5 is a five-driver speaker system that includes two tweeters, two mid-range drivers, and one subwoofer. When playing audio content via the S5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on may be played from a Sonos® S5. While the S5 is an example of a zone player with speakers, it is understood that a zone player with speakers is not limited to one with a certain number of speakers (e.g., five speakers as in the S5), but rather can contain one or more speakers. Further, a zone player may be part of another device, which might even serve a purpose different than audio (e.g., a lamp).

IV. Example Controller

Figure 5:
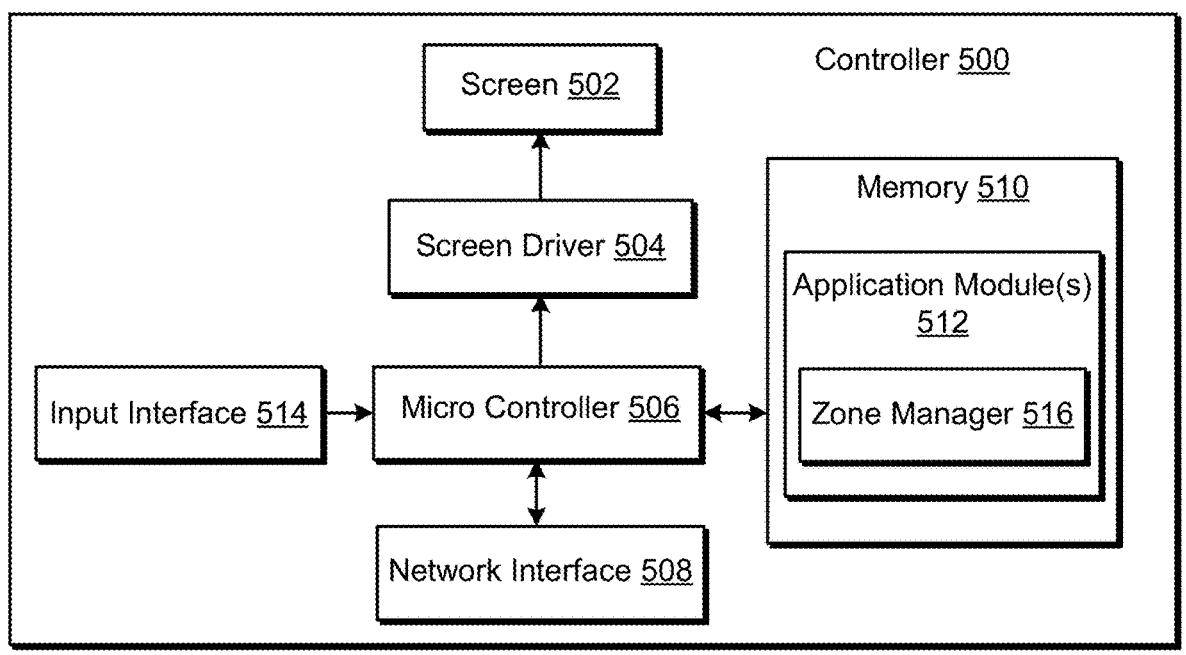
FIG. 5 shows an internal functional block diagram of an example controller.

Referring now to FIG. 5, there is shown an example controller 500, which may correspond to the controlling device 130 in FIG. 1. The controller 500 may be used to facilitate the control of multi-media applications, automation and others in a system. In particular, the controller 500 is configured to facilitate a selection of a plurality of audio sources available on the network and enable control of one or more zone players (e.g., the zone players 102-124 in FIG. 1) through a wireless network interface 508. According to one embodiment, the wireless communication is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio source may be transmitted from a zone player or other electronic device to the controller 500 for display.

The controller 500 is provided with a screen 502 and an input interface 514 that allows a user to interact with the controller 500, for example, to navigate a playlist of many multimedia items and to control operations of one or more zone players. The screen 502 on the controller 500 may be an LCD screen or a touchscreen, for example. The screen 500 communicates with and is commanded by a screen driver 504 that is controlled by a microcontroller (e.g., a processor) 506.

The controller 500 includes a network interface 508 that facilitates wireless communication with a zone player. In some embodiments, the commands such as volume control and audio playback synchronization are sent via the network interface 508. In some embodiments, a saved zone group configuration is transmitted between a zone player and a controller via the network interface 508. There may be more than one controller for a particular system. Further, a controller may be integrated into a zone player.

In certain embodiments, a user may create a zone group including at least two zone players from the controller 500. The zone players in the zone group may play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 may group zone players into a zone group by activating a "Link Zones" soft button, or de-grouping a zone group by activating an "Unlink Zones" or "Drop Zone" button. For example, one mechanism for 'joining' zone players together for audio play back is to link a number of zone players together to form a group. To link a number of zone players together, a user may manually link each zone player or room one after the other. For example, assume that there is a multi-zone media playback system that includes the following zones: Bathroom, Bedroom, Den, Dining Room, Family Room, and Foyer.

In certain embodiments, a user can link any number of zone players (e.g., the zone players 102-124 of FIG. 1), for example, by starting with a single zone and then manually linking each zone to that zone. In certain embodiments, a set of zones can be dynamically linked together using a command to create a zone scene or theme (subsequent to first creating the zone scene). For instance, a "Morning" zone scene command may link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes may be programmed.

In certain embodiments, a zone scene may be triggered based on time (e.g., an alarm clock function). For instance, a zone scene may be set to apply at 8:00 am. The system can link appropriate zones automatically, set specific music to play, and then stop the music after a defined duration. Although any particular zone may be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, etc.), a backup buzzer may be programmed to sound. The buzzer may include a sound file that is stored in a zone player, for example.

The memory 510 may be loaded with one or more application modules 512 that can be executed by the microcontroller 506 with or without a user input via the user interface 514 to achieve certain tasks. In operation, when the microcontroller 506 executes one or more of the application modules 512, the screen driver 504 generates control signals to drive the screen 502 to display an application specific user interface accordingly. In some embodiments, a first one of the application module(s) 512 is configured to facilitate grouping a number of selected zone players into a zone group and synchronizing the zone players for audio play back. In some embodiments, a second one of the application module(s) 512 is configured to control the audio sounds (e.g., volume) of the zone players in a zone group.

In the illustrated example of FIG. 5, the application module(s) 512 include a zone manager 516 constructed in accordance with the teachings of this disclosure. The example zone manager 516 manages a plurality of zones, each corresponding to a set of playback devices (e.g., zone players and/or speakers) defined to embody a respective zone. The example zone manager 516 is described in detail below in connection with FIGS. 6-14.

It should be noted that other network-enabled devices such as an iPhone®, iPad® or any other smart phone or network-enabled device (e.g., a networked computer such as a PC or Mac® may also be used as a controller) may be used as a controller to interact or control zone players in a particular environment. In such instances, the application module(s) 512, including the example zone manager 516, may be implemented in connection with an application or program downloaded or otherwise executed by the network enabled device(s) (e.g., an iPhone® iPad® or any other smart phone or network-enabled device). In some embodiments, a software application or upgrade may be downloaded onto a network enabled device to perform the functions disclosed herein.

V. Managing Zones of a Multi-Zone Media Playback System

Figure 6:
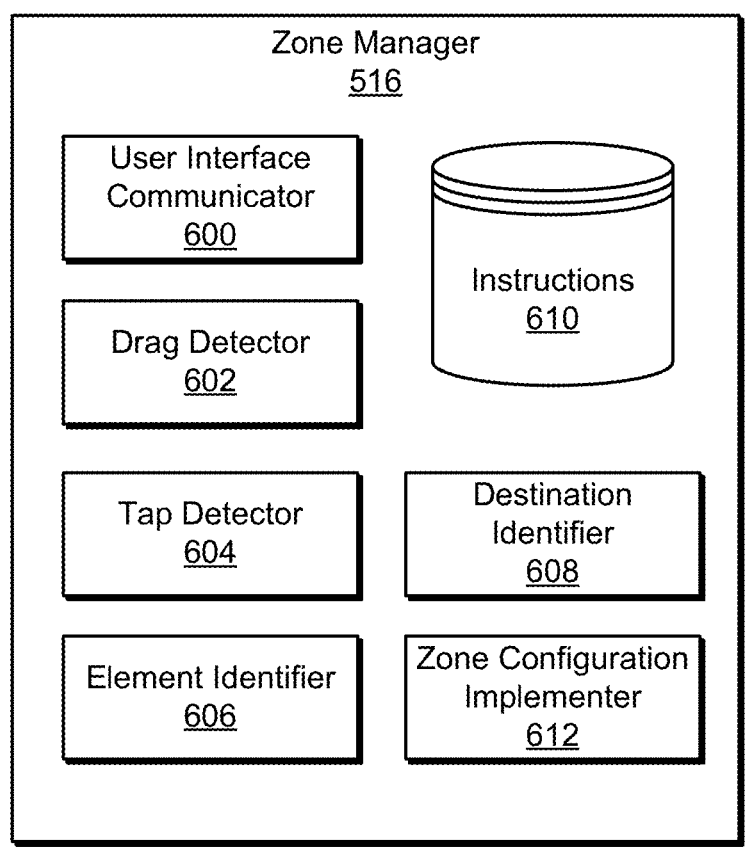
FIG. 6 shows an internal functional block diagram of an example implementation of the zone manager of FIG. 5.

An example apparatus that may be used to implement the example zone manager 516 of FIG. 5 is illustrated in FIG. 6. Generally, the example zone manager 516 of FIG. 6 enables a user of a touch screen interface to quickly and efficiently manage zones of a multi-zone media playback system, such as the system 100 of FIG. 1. In particular, the zone manager 516 detects certain interactions between a user of the controller 500 and a user interface implemented by the controller 500 (e.g., an interface providing data to the input interface 514). The example zone manager 516 interprets the detected interactions and configures one or more aspects related to the zones of the multi-zone media playback system 100 accordingly. Unlike previous systems that required the user to navigate to a screen or interface dedicated to a specific zone to configure that zone, the example zone manager 516 of FIGS. 5 and/or 6 enables the user to configure one or more zones from a single screen or interface via simple gesture(s) (e.g., drag and drop). In other words, using the zone manager 516 of FIG. 5, the user can configure one or more zones from a single screen using simple gestural commands instead of having to navigate through a series of separate screens each dedicated to a particular zone.

Figure 7:
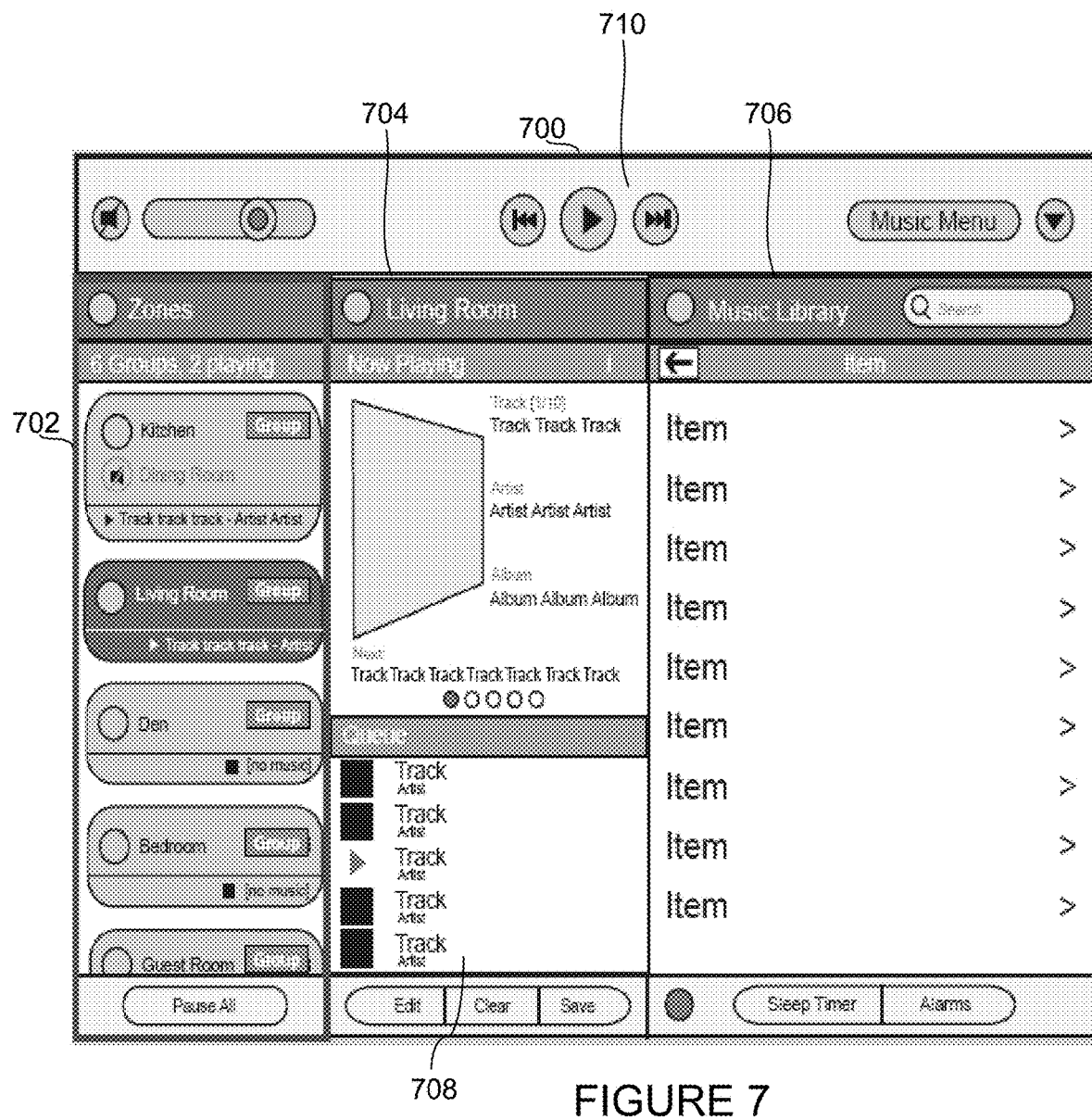
FIG. 7 is a screenshot of an example user interface associated with the example controller of FIG. 5.

The example zone manager 516 of FIG. 6 includes a user interface communicator 600. The user interface communicator 600 interacts with or may be integrated with a user interface of the controller 500, such as a user interface providing input to the input interface 514 of FIG. 5. The user interface communicator 600 enables the zone manager 516 to receive information regarding such inputs. Additionally or alternatively, the user interface communicator 600 designates a portion of a display to be presented on the screen 502 to be associated with the zone manager 516. In the illustrated example, the user interface communicator 600 designates a Zone section of a user interface implemented by the controller 500 for an input that influences one or more configurations of the multi-zone media playback system 100. FIG. 7 is a screenshot 700 of an example user interface that may be implemented by the controller 500 and/or into which the user interface communicator 600 of FIG. 6 may be integrated. In the illustrated example, a Zone section 702 is designated to be associated with the example zone manager 516. The Zone section 702 includes information related to the zones of the multi-zone media playback system 100 of FIG. 1. The example screenshot 700 of FIG. 7 also includes a Now Playing section 704 that includes information related to a media presentation (e.g., output of an audio track) being presented in a particular zone (e.g., the Living Room zone). The example screenshot 700 of FIG. 7 also includes a Media Source section 706, which includes a music library of media items available to the user of the controller 500. The library of the Media Source section 706 can include one or more of a local library of media items, a non-local library of media items, media items from a media service of a cloud, media items listing as search results from a query of the cloud service, and/or any other suitable source of media items available to the controller 500. The example screenshot 700 of FIG. 7 also includes a Queue section 708, which reflects a list of media items to be presented by the devices (e.g., zone players and/or playback devices) in the zone shown in the Now Playing section 704, for example.

Figure 8:
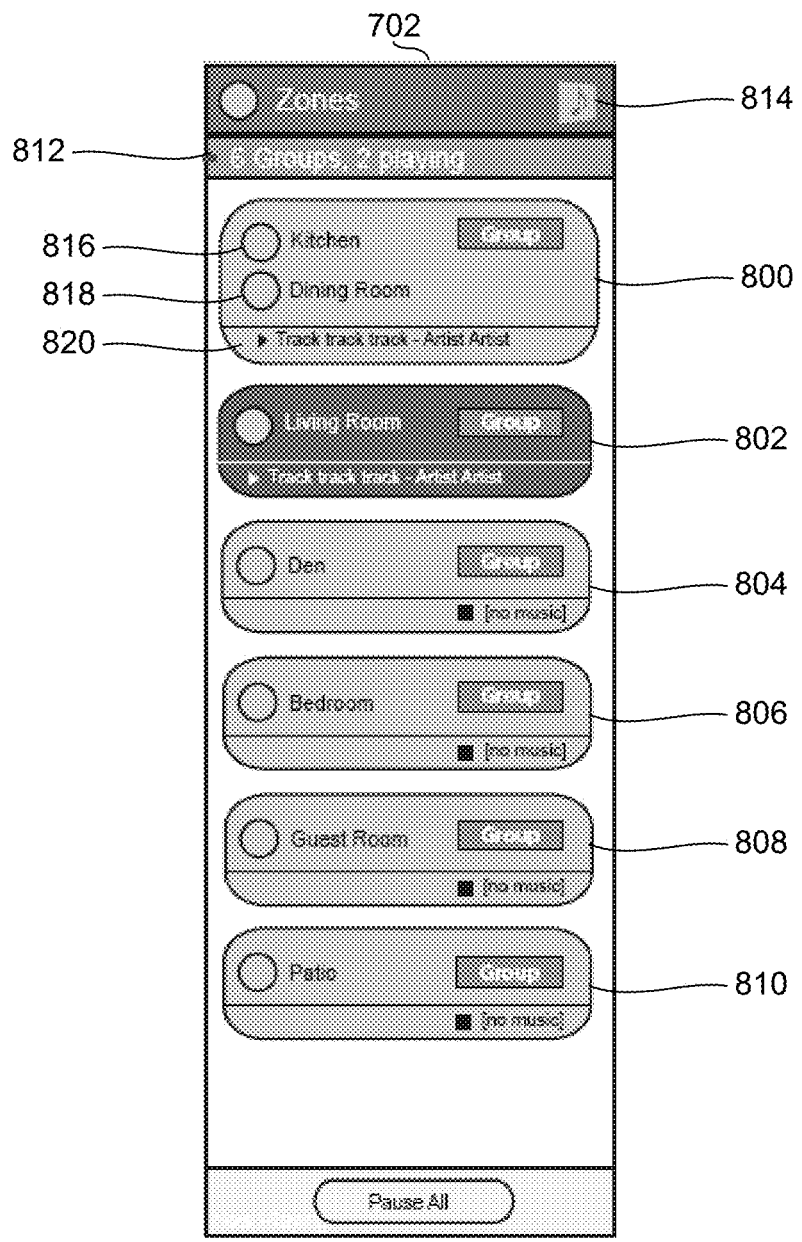
FIG. 8 is a screenshot of an example zone panel of the example user interface of FIG. 7.

An isolated view of the Zone section 702 is shown in FIG. 8. The Zone section 702 may be implemented into any aspect of the user interface implemented by the controller 500 (e.g., as an overlay, adjacent the Media Source section 706, etc.). The example Zone section 702 of FIG. 8 includes a plurality of icons 800-810 representative of zone groups. The zone group icons 800-810 may include a label to receive a user-selectable title. The example Zone section 702 also includes an information section 812 to indicate, for example, a current number of groups and a number of groups currently playing a media item. The example Zone section 702 also includes a now playing icon 814. In the illustrated example, the now playing icon 814 can be engaged to cause the Zone section 702 to change (e.g., flip) into one or more different one(s) of the user interface sections shown in, for example FIG. 7 (e.g., the Now Playing section 704 and/or the Queue section 708). Each of the zone groups includes one or more zones of the system 100 of FIG. 1 as selected by a user or administrator of the system 100. As described above, a zone may be defined to include one or more playback devices (e.g., zone players) located in one or more rooms of the system 100. Additionally, zones can be grouped to form zone groups. For example, a first zone including two playback devices in a kitchen can be combined with a second zone including one playback device in a dining room to form a zone group including playback devices in the kitchen and dining room. The resulting zone group can be grouped based on proximity of the kitchen to the dining room and/or a characteristic of the rooms or zones (e.g., eating areas). As described above, playback devices can be zoned and zones can be grouped according to any desire of the user. A first one of the zone group icons 800 in the example of FIG. 8 represents a first zone group including a kitchen zone and a dining room zone. In the first zone group icon 800, a first zone icon 816 is placed adjacent a label corresponding to the kitchen zone and a second zone icon 818 is placed adjacent a label corresponding to the dining room zone. Further, the first zone group icon 800 includes a now playing status bar 820 indicative of a media item (e.g., a song) being presented by the playback devices of the first zone group. Interactions and responses to the interactions related to the elements of the Zone section 702 to manage the zones and/or zone groups of the system are described in detail below.

Referring back to FIG. 6, the user interface communicator 600 receives information related to interactions between a user and the Now Playing section 702 and provides the received information to a drag detector 602, a tap detector 604, an element identifier 606, and a destination identifier 608. The drag detector 602 interprets information received via the user interface communicator 600 to determine whether the user has dragged an icon across the display using, for example, the touch screen implementing the display or a cursor that has selected a display element. For example, the drag detector 602 may determine if a continuous line or streak of inputs occurred across a touch screen. Additionally or alternatively, the drag detector 602 may determine that a cursor has selected an element and has been dragged across a user interface. Similarly, the tap detector 604 interprets information received via the user interface communicator 600 to determine whether the user has tapped an icon using, for example, the touch screen implementing the display or a button associated with a cursor. For example, the tap detector 604 may determine whether a designated shape (e.g., a button of a mouse or a finger) engaged the screen for a designated period of time (e.g., two tenths of a second). Such inputs (e.g., drags and taps) are understood by the user (e.g., as explained in a user manual) to manage the zones and/or zone groups of the Zone section 702 in one or more manners.

The element identifier 606 also interprets information received via the user interface communicator 600 to identify which element (e.g., icon) of the Zone section 702 corresponds to a detected drag and/or tap. For example, the element identifier 606 may determine a coordinate of a detected drag or tap on the display and use the coordinate to reference a database including mappings of the elements of the Zone section 702. That is, by detecting a location of an interaction with one of the elements (e.g., icons) and determining which element is current displayed at that location, the element identifier 606 identifies the element with which the interaction (detected by the drag detector 602 or the tap detector 604) occurred.

The destination identifier 608 also interprets information received via the user interface communicator 600 to identify a location on the display at which a dragged element is dropped or stops being dragged. For example, the destination identifier 608 may determine a location at which a detected drag is no longer providing input to the user interface after providing input continuously across the user interface. Elements can be dragged and dropped on any suitable area of the display including, for example, on top of other display elements or unoccupied space of the display.

Together, the drag detector 602, the tap detector 604, the element identifier 606, and the destination identifier 608 are able to determine the intention of the user behind the detected and analyzed interaction with the touch screen. Certain interactions are defined in to result in, for example, configuration (or reconfiguration) of the zone groups, configuration of the display or user interface, presentation of media item(s) in one or more zones and/or zone groups, etc. The interactions defined by the zone manager 516 to configure the zones of the system 100 are provided to a user of the controller 500 using, for example, a user manual or a help interface implemented on the controller 500 and/or in a separately provided publication (e.g., a booklet o dedicated web page). Moreover, the definitions associated with the configuration of the zones using the zone manager 516 are stored in an instructions database 610. Thus, the instructions database 610 includes a plurality of entries, each corresponding to a detected interaction with the touch screen of the controller 500. One or more configuration instructions are stored in connection with each entry of the instructions database 610. The instructions database 610 can be referenced or queried with a certain interaction detected on the controller 500 and will return instruction(s) regarding how the zone(s), zone group(s), playback device(s), etc. are to be configured (or reconfigured). The definitions of the instructions database 610 are supplied by any suitable source (e.g., a designer or manufacturer of the controller 500, a provider of the system 100 of FIG. 1, a designer or manufacturer of the playback devices, etc.) and may be customizable and/or adjustable by any suitable party (e.g., a user of the system 100 or the controller 500, a provider of the system 100, a provider of the playback devices, etc.).

The example zone manager 516 of FIG. 6 includes a zone configuration implementer 612 to carry out the configuration instructions of the instructions database 610. In the illustrated example, the implementer 612 receives data from one or more of the drag detector 602, the tap detector 604, the element identifier 606, and the destination identifier 608. Using the received data, the implementer 612 references the instructions database 610 to determine how, if at all, the zone(s), zone group(s), playback device(s), etc. are to be configured (or reconfigured). The implementer 612 then facilitates any changes in accordance with the instructions of the database 610. For example, the implementer 612 may work with the user interface communicator 600 to change one or more aspects or settings of the display. Additionally or alternatively, the implementer 612 may work with an interface (e.g., the network interface 508) to communicate instructions to one or more playback devices to output a media item. Additionally or alternatively, the implementer 612 may change one or more zone group definitions such that a new zone group is added to the system 100, a zone is moved from one zone group to another, a zone is copied into a second zone group, a zone is eliminated from a zone group, etc. These and other configurations of the system 100 and/or the controller 500 are implemented by the configuration implementer 612 as described below in connection with FIGS. 9-13.

Figure 9:
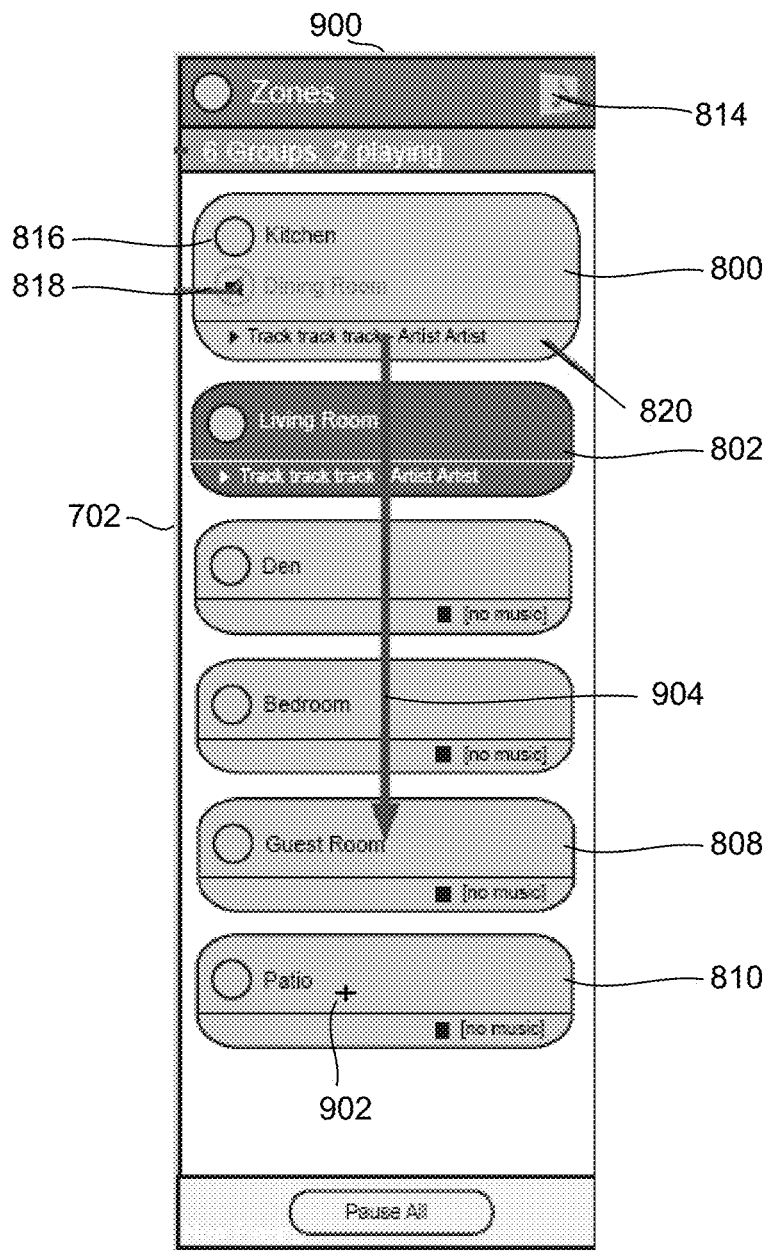
FIG. 9 is a screenshot of an example zone panel of the example user interface of FIG. 7.

FIG. 9 is a screenshot illustrating example interactions that may be detected and processed by the example zone manager 516 of FIG. 6 in connection with the Zone section 702 of FIGS. 7 and/or 8. In particular, the tap detector 604 can detect a tap in a location of the screenshot 900 corresponding to the now playing icon 814. In such instances, the element identifier 606 determines that the tapped location corresponds to the now playing icon 814. In response to receiving data indicative of the tap of the now playing icon 814, the implementer 612 references the instructions database 610. In accordance with the corresponding instructions of the database 610, the implementer 612 causes the screen driver 504, for example, to alter the display on the screen 502. In the illustrated example, the alteration of the display includes the Zone section 702 being flipped to reveal the Now Playing section 704 or the Queue section 708 in the space previously occupied by the Zone section 702.

Additionally, the tap detector 604 can detect a tap in a location of the screenshot 900 corresponding to the now playing status bar 820. As descried above, the now playing status bar 820 is indicative of a media item (e.g., a song) being presented by the playback device(s) of the zone group corresponding to the icon in which the now playing status bar 820 is displayed. In the illustrated example of FIG. 9, the element identifier 606 determines that the tapped location corresponds to the now playing status bar 820 of the first zone group icon 800. In response to receiving data indicative of a tap of the now playing status bar 820 associated with the first zone group icon 800, the implementer 612 references the instructions database 610. In accordance with the corresponding instructions of the database 610, the implementer 612 causes the controller 500 (e.g., via the micro controller 506) to toggle the corresponding media item from playing or pausing/stop. That is, if the media item was being presented before the detected tap of the now playing status bar 820, the media item is paused or stopped. On the other hand, if the media item was paused or stopped before the detected tap of the now playing status bar 820, the media item is played in connection with the zone group being represented by the first zone group icon 800.

Additionally, the tap detector 604 can detect a tap in a location of the screenshot 900 corresponding to one of the zone icons. In the illustrated example of FIG. 9, the element identifier 606 determines that the tapped location corresponds to the zone icon 818 representing the dining room zone. In response to receiving data indicative of a tap of the zone icon 818 of the first zone group icon 800, the implementer 612 references the instructions database 610. In accordance with the corresponding instructions of the database 610, the implementer 612 causes the controller 500 (e.g., via the micro controller 506) to toggle the volume level of the corresponding zone (e.g, the dining room zone) between a mute and non-mute state. In such instances, the zone group in which the zone icon is placed is not selected as a current zone. Instead, the operation of the zone associated with the icon is altered directly. That is, the example zone manager 516 enables the user to mute a zone with having to navigate to a screen or interface dedicated solely to the dining zone. The implementer 612 can also cause the screen 502 to display a mute graphic or a no-mute graphic proximate the zone when the tap detector 604 detects a change, for example.

Additionally, the tap detector 604 can detect a tap in a location of the screenshot 900 corresponding to one of the zone group icons. In the illustrated example of FIG. 9, the element identifier 606 determines that the tapped location corresponds to the second zone group icon 802 representing the second zone group (which includes a living room zone). In response to receiving data indicative of a tap of the second zone group icon 802, the implementer 612 references the instructions database 610. In accordance with the corresponding instructions of the database 610, the implementer 612 causes the controller 500 (e.g., via the micro controller 506) to select the second zone group as the current zone group. Such a selection of a zone group as the current zone group causes other aspects of the controller to control the selected zone group. For example, a Control section 710 of FIG. 7 will control playback devices of the selected zone group. Further, the implementer 612 can also cause the screen 502 to highlight the selected current zone group in response to the detected tapping of that zone group.

Additionally, the tap detector 604 can detect a tap in a location of the screenshot 900 corresponding to a 'plus' icon 902 in one of the zone group icons 800-812. In the illustrated example of FIG. 9, the element identifier 606 determines that the tapped location corresponds to a 'plus' icon 902 in the sixth zone group icon 810. In response to receiving data indicative of a tap of the 'plus' icon 902, the implementer 612 reference the instructions of the database 610. In accordance with the corresponding instructions of the database 610, the implementer 612 causes the screen driver 504 to cause the display of the screen 502 to expand the sixth zone group icon 810 to reveal additional zones in the sixth zone group. While the screenshot 900 shows only a patio zone being listed in the sixth zone group icon 810, the 'plus' icon 902 indicates that the sixth zone group has more zones than are listed. Tapping of the 'plus' icon 902 causes the sixth zone group icon 810 to extend vertically to reveal the additional zones. In some examples, the expanded version of the sixth zone group icon 810 may have a 'minus' icon in lieu of the 'plus' icon 902,' the selection of which cause the sixth zone group icon 810 to retract to again only reveal a subset of the zones of the sixth zone group.

Additionally, the drag detector 604 can detect a drag of a display element across the screenshot 900. In some examples, the drag detector 604 detects a drag of one of the zone group icons 800-812. An example drag is shown in FIG. 9 by an arrow 904. In particular, a user has dragged the now playing status bar 820 of the first zone group icon 800, which represents the currently played stream of media in the first zone group playback device(s). The example element identifier 606 identifies the now playing status bar 820 as the element being dragged. Further, the destination identifier 608 identifies a location at which the dragged element is dropped (e.g., where the detected drag ended). In the example of FIG. 9, the destination identifier 608 identifies a fifth zone group icon 808 as the destination of the dragged now playing status bar 820. In response to receiving data indicative of a drag of the now playing status bar 820 to the fifth zone group icon 808, the implementer 612 references the instructions of the database 610. In accordance with the corresponding instructions of the database 610, the implementer 612 causes the controller 500 to instruct the playback devices of the fifth zone group to output the media stream corresponding to the dragged now playing status bar 820. That is, the implementer 612 causes the media being output at the time of the detected drag to be output in the zone group corresponding to the destination of the drag. In some examples, the media steam may cease in the zone group from which the drag occurred (e.g., the first zone group in the example of FIG. 9). In some examples, the media stream continues to play in the zone group from which the drag occurred. In some examples, a queue associated with the dragged media stream is also transferred to the destination zone group and the destination zone group continues to play the queue media items. Thus, the fifth zone group 808 seamlessly picks up the media stream that was dragged from the first zone group 800 to the fifth zone group 808 via the now playing status bar 820.

Figure 10:
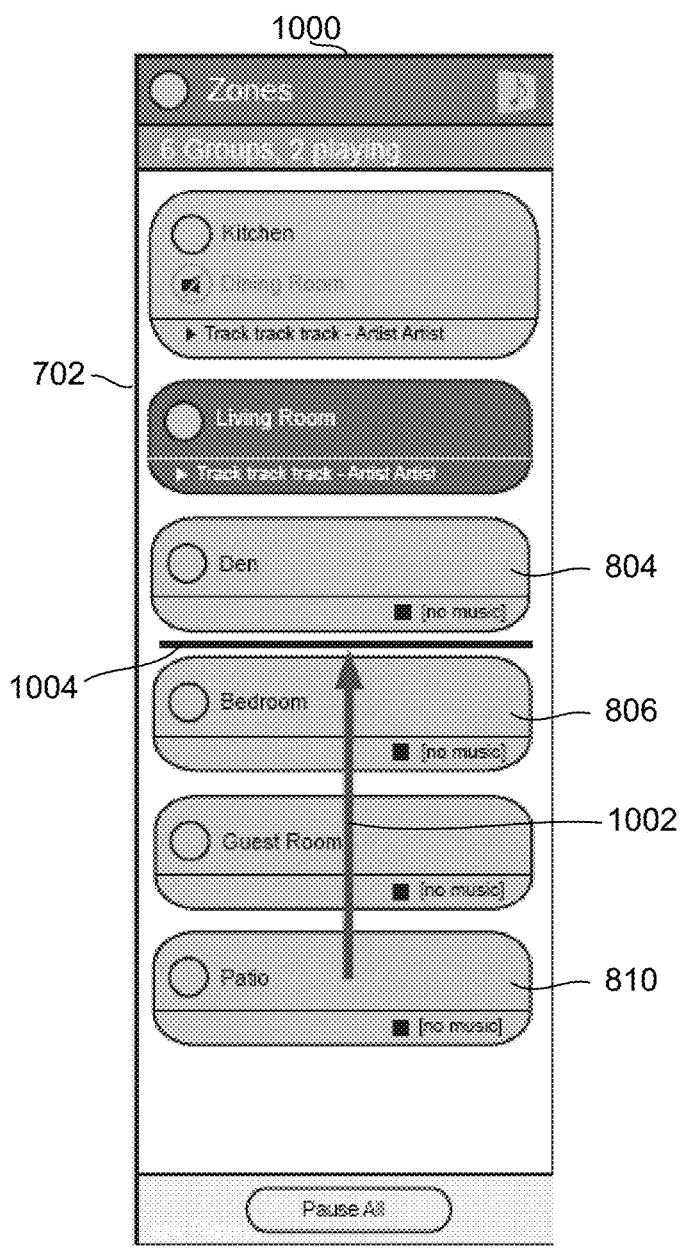
FIG. 10 is a screenshot of an example zone panel of the example user interface of FIG. 7.

FIG. 10 is a screenshot 1000 of the example Zone section 702 illustrating an example interaction that may be detected and processed by the example zone manager 516 of FIGS. 5 and/or 6. In particular, the drag detector 604 detects a drag of the sixth zone group icon 810 up the list of zone group icons 800-810. Such a drag is shown in FIG. 10 by an arrow 1002. The example element identifier 606 identifies the sixth zone group icon 810 as the element being dragged. Further, the destination identifier 608 identifies a location at which the dragged element is dropped (e.g., where the detected drag ended). In the example of FIG. 10, the destination identifier 608 identifies a space between the third zone group icon 804 and the fourth zone group icon 806 as the destination of the dragged sixth zone group icon 810. In response to receiving data indicative of a drag of the sixth zone group icon 810, the implementer 612 references the instructions of the database 610. In accordance with the corresponding instructions of the database 610, the implementer 612 causes the screen driver 504 to alter the display on the screen 502 such that the zone group icons are reordered to insert the sixth zone group icon between the third and fourth icons 804 and 806, respectively. In the illustrated example, a drop zone target line 1004 appears as the element (e.g., the icon 810) is dragged among the zone group icons.

Figure 11:
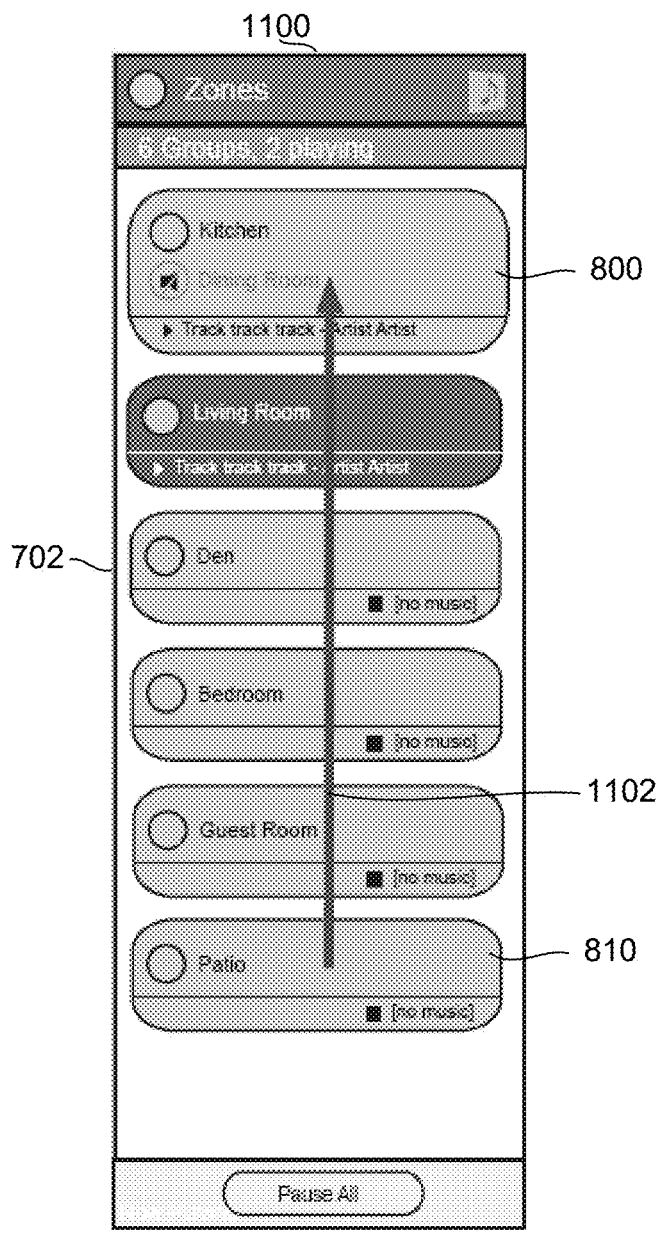
FIG. 11 is a screenshot of an example zone panel of the example user interface of FIG. 7.

FIG. 11 is a screenshot 1100 of the example Zone section 702 illustrating an example interaction that may be detected and processed by the example zone manager 516 of FIGS. 5 and/or 6. In particular, the drag detector 604 detects a drag of the sixth zone group icon 810 up the list of zone group icons 800-810. Such a drag is shown in FIG. 11 by an arrow 1102. The example element identifier 606 identifies the sixth zone group icon 810 as the element being dragged. Further, the destination identifier 608 identifies a location at which the dragged element is dropped (e.g., where the detected drag ended). In the example of FIG. 11, the destination identifier 608 identifies one of the other zone group icons as the destination of the dragged sixth zone group icon 810. In the illustrated example, the sixth zone group icon 810 is dragged onto the first zone group icon 800. In response to receiving data indicative of a drag of the sixth zone group icon 810 onto the first zone group icon 800, the implementer 612 references the instructions of the database 610. In accordance with the corresponding instructions of the database 610, the implementer 612 causes the controller 500 (e.g., via the micro controller 506) to add the zones of the sixth zone group to the first zone group. For example, the implementer 612 causes the screen driver 504 to alter the display on the screen 502 such that the zones of the sixth zone group are listed in the first zone group icon 800. Further, a list maintaining the configurations of the zone groups (e.g., a memory tracking the assignments of zones to zone groups) is updated to reflect the new members of the first zone group. In some examples, the zone group icons onto which the dragged element is dragged over are highlighted to indicate a drop target if the element is dropped at a corresponding location.

Figure 12:
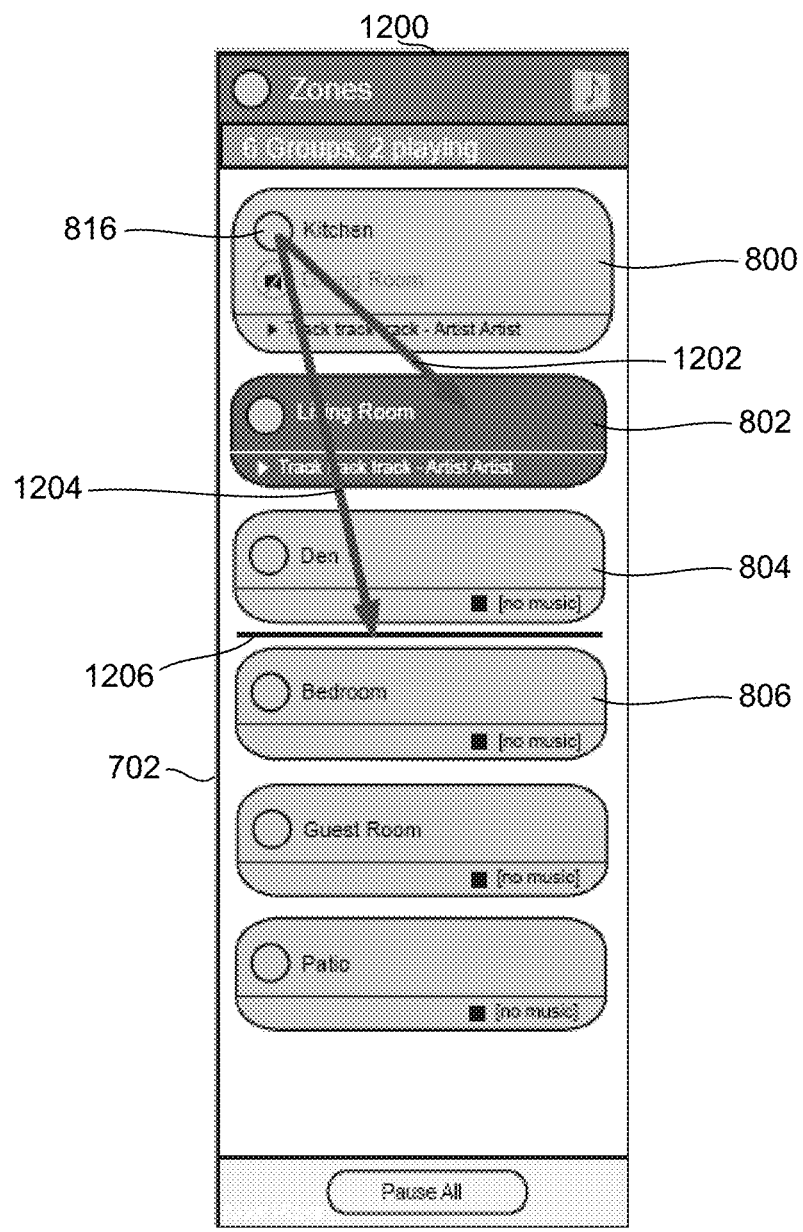
FIG. 12 is a screenshot of an example zone panel of the example user interface of FIG. 7.

FIG. 12 is a screenshot 1200 of the example Zone section 702 illustrating an example interaction that may be detected and processed by the example zone manager 516 of FIGS. 5 and/or 6. In particular, the drag detector 604 detects a drag of a zone icon of a zone group icon to another zone group icon. One such example drag is shown in FIG. 12 by a first arrow 1202. In particular, the example element identifier 606 identifies the zone icon 816 corresponding to the kitchen zone as being dragged. Further, the destination identifier 608 identifies the second zone group icon 802 as the destination of the dragged zone icon 816 (as shown by the first arrow 1202). In response to receiving data indicative of a drag of the zone icon 816 onto the second zone group icon 802, the implementer 612 references the instructions of the database 610. In accordance with the corresponding instructions of the database 610, the implementer 612 causes the controller 500 (e.g., via the micro controller 506) to add the zone corresponding to the dragged zone icon 816 (e.g., the kitchen zone) the second zone group. For example, the implementer 612 causes the screen driver 504 to alter the display on the screen 502 such that the kitchen zone is listed in the second zone group icon 802. Further, a list maintaining the configurations of the zone groups (e.g., a memory tracking the assignments of zones to zone groups) is updated to reflect the new member of the second zone group. In some examples, the zone group icons onto which the dragged element is dragged over are highlighted to indicate a drop target if the element is dropped at a corresponding location.

Another drag of the zone icon 816 is shown in FIG. 12 by a second arrow 1204. In particular, the example element identifier 606 identifies the zone icon 816 corresponding to the kitchen zone as being dragged. Further, the destination identifier 608 identifies a space 1206 between the third zone group icon 804 and the fourth zone group icon 806 as the destination of the dragged zone icon 816. In response to receiving data indicative of a drag of the zone icon 816, the implementer 612 references the instructions of the database 610. In accordance with the corresponding instructions of the database 610, the implementer 612 causes the screen driver 504 to alter the display on the screen 502 such that a new zone group is displayed at the identified destination. Further, a list maintaining the configurations of the zone groups (e.g., a memory tracking the assignments of zones to zone groups) is updated to reflect the new zone group. The new zone group includes the zone corresponding to the dragged zone icon 816. In some examples, the zone is removed from the first zone group.

Figure 13:
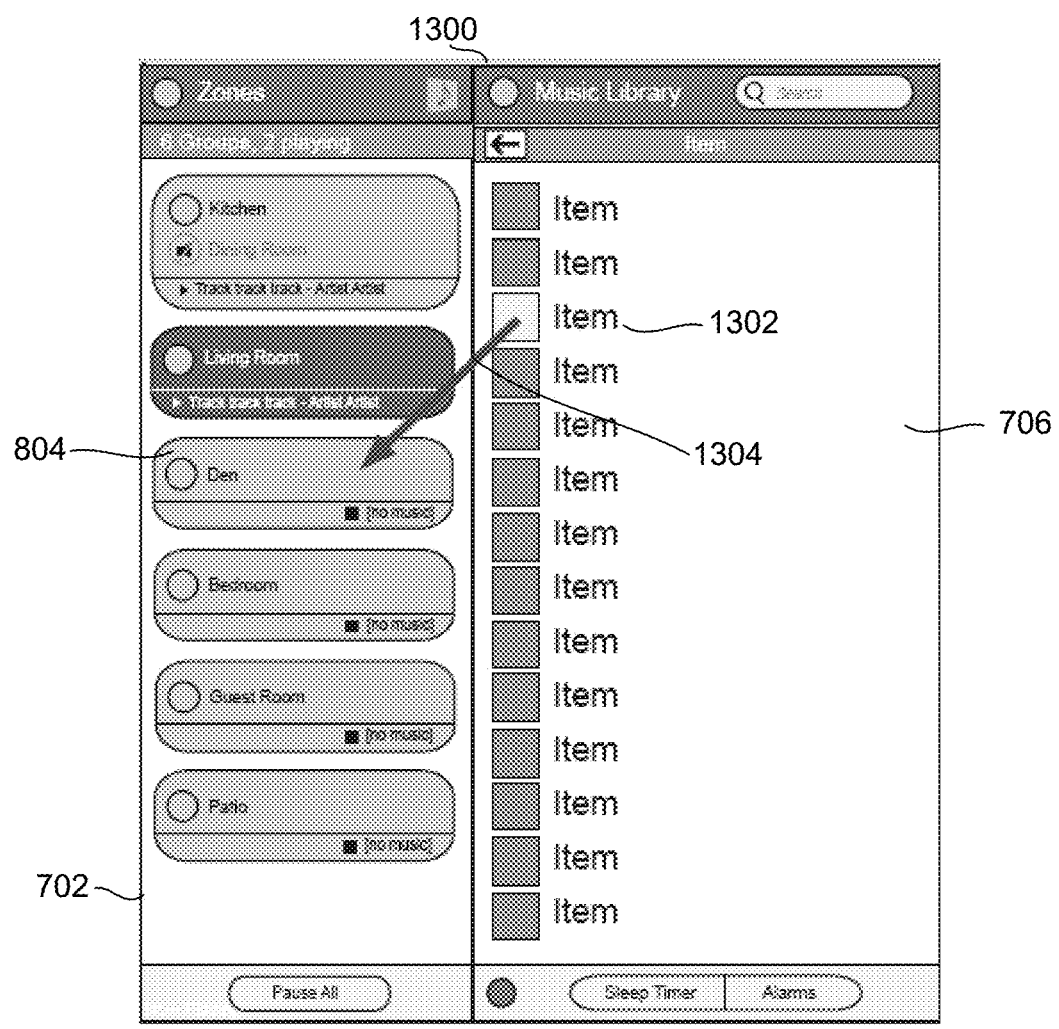
FIG. 13 is a screenshot of an example zone panel of the example user interface of FIG. 7.

FIG. 13 is a screenshot 1300 of the example Zone section 702 and the example Music Source section 706 illustrating an example interaction that may be detected and processed by the example zone manager 516 of FIGS. 5 and/or 6. In particular, the drag detector 604 detects a drag of a media item 1302 from the Music Source section 706 to a zone group icon. Such a drag is shown in FIG. 13 by an arrow 1304. In particular, the example element identifier 606 identifies the media item 1302 as the element being dragged. The media item 1302 represents, for example, a song, a playlist of songs, a streaming channel, a station, etc. The destination identifier 608 identifies the third zone group icon 804 as the destination of the dragged media item 1302 (as shown by the arrow 1304). In response to receiving data indicative of a drag of the media item 1302 onto the third zone group icon 804, the implementer 612 references the instructions of the database 610. In accordance with the corresponding instructions of the database 610, the implementer 612 causes the controller 500 (e.g., via the micro controller 506) instruct the playback device(s) of the third zone group to play the media content corresponding to the media item 1302. The implementer 612 may also cause the screen driver 504 to alter the display on the screen 502 such that data representative of the media item 1302 is presented in the now playing status bar of the third zone group icon 804. In some examples, the drag described above in connection with the arrow 1304 does not change the current zone group, as the second zone group remains the currently selected zone group (e.g., as indicated by the highlighting of the second zone group icon 802).

Figure 14:
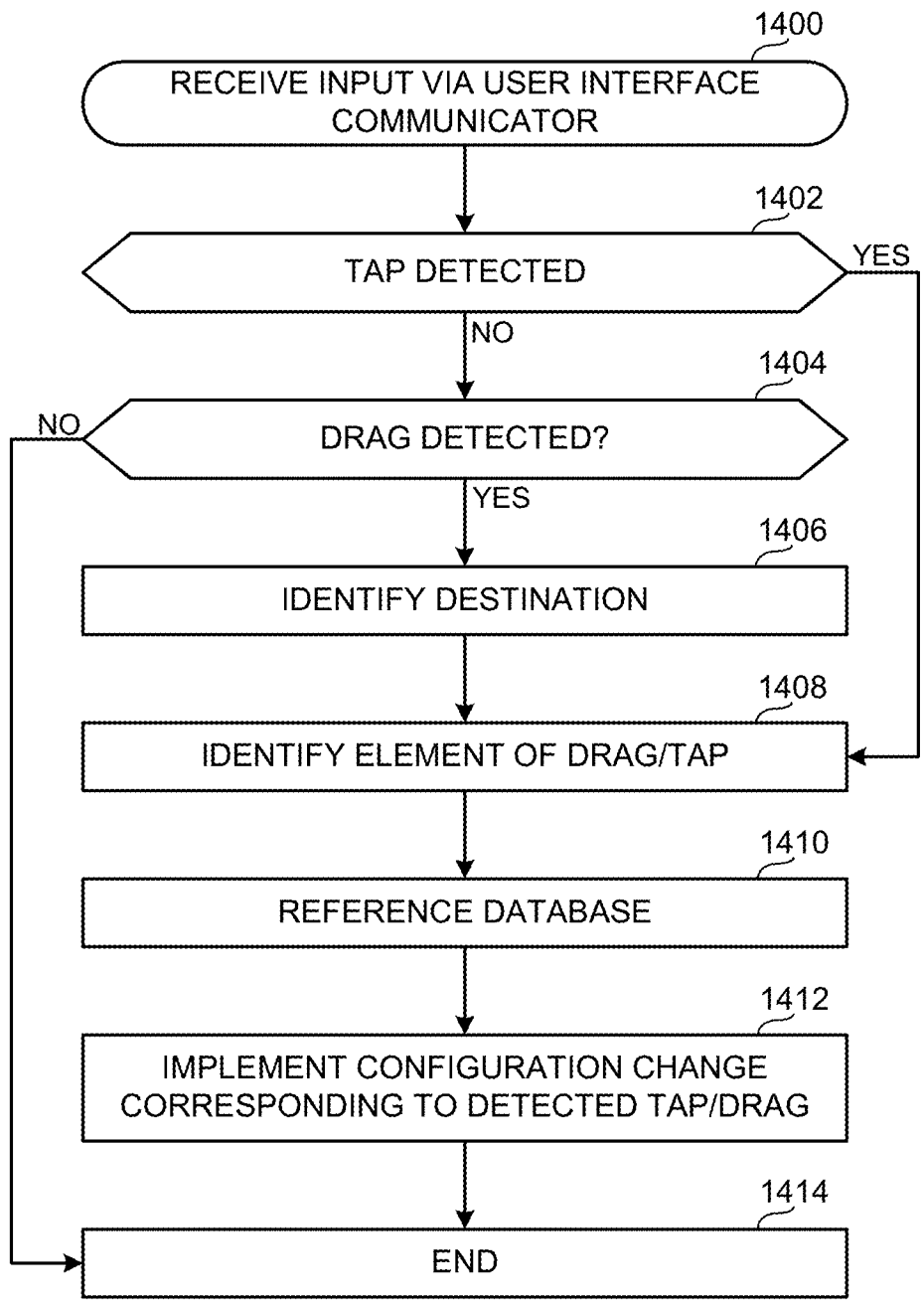
FIG. 14 is a flow diagram representative of example machine readable instructions that can be executed to implement the example zone manager of FIGS. 5 and/or 6.

FIG. 14 is a flow diagram representative of example machine readable instructions that may be executed to implement the example zone manager 516 of FIGS. 5 and/or 6. The example of FIG. 14 begins with the user interface communicator 600 receiving an input from the screen 502 of the controller 500 (block 1400). The components of the example zone manager 516 analyze the received input to determine a type of the input, an element associated with the input, and a destination associated with the input (if any). In the illustrated example, the tap detector 604 determines whether the input corresponds to a user tapping the screen 502 (which may be implemented by a touch screen and/or a screen including a cursor) (block 1402). If the input corresponds to a tap control passes to block 1408. If the input does not correspond to a tap, the drag detector 602 determines whether the input corresponds to a drag of a display element (block 1404). If the input does not correspond to a drag at block 1404, the example of FIG. 14 ends (block 1414). If the input does corresponds to a drag of a display element, the destination identifier 608 determines a location on the user interface at which the dragged display element was dropped (block 1406).

The element identifier 606 then identifies which of the display elements was dragged or tapped (block 1408). The instructions database 1610 is then queried with the information gathered by the drag detector 602, the tap detector 604, the element identifier 606, and/or the destination identifier 608 to determine one or more actions to take in connection with the system 100 in response to the received input (block 1410). The database 1610 then provides the appropriate instructions to the zone configuration implementer 1612, which implements the corresponding configuration (or reconfiguration) of the zones of the system 100 (block 1412). Example configurations are demonstrated above in connection with FIGS. 7-13. The example of FIG. 9 then ends (block 1414).

Various inventions have been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the present disclosure as claimed. While the embodiments discussed herein may appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

What is claimed is:

1. Tangible, non-transitory computer-readable media comprising instructions stored therein, wherein the instructions, when executed cause a computing device to perform a method comprising:

displaying a graphical user interface comprising a first section and a second section, wherein the first section includes a first media icon corresponding to a first media item, wherein the second section includes (i) a first zone icon corresponding to a first zone comprising a first set of one or more playback devices and (ii) a second zone icon corresponding to a second zone comprising a second set of one or more playback devices;

in response to detecting a drag of the first media icon to the first zone icon, instructing at least one playback device in the first set of one or more playback devices to play the first media item corresponding to the first media icon;

after instructing at least one playback device in the first set of one or more playback devices to play the first media item corresponding to the first media icon, displaying a playback status icon for the first media item in a third section of the graphical user interface; and in response to detecting a drag of the playback status icon for the first media item to the second zone icon, instructing at least one playback device in the second set of one or more playback devices to play the first media item corresponding to the first media icon.

2. The tangible, non-transitory computer-readable media of claim 1, wherein instructing at least one playback device in the second set of one or more playback devices to play the first media item corresponding to the first media icon comprises instructing at least one playback device in the second set of one or more playback devices to play the first media item corresponding to the first media icon in synchrony with at least one playback device in the first set of one or more playback devices.

3. The tangible, non-transitory computer-readable media of claim 1, wherein the method further comprises:

in response to detecting a drag of the playback status icon for the first media item to the second zone icon, additionally instructing at least one playback device in the first set of one or more playback devices to cease playback of the first media item.

4. The tangible, non-transitory computer-readable media of claim 1, wherein instructing at least one playback device in the second set of one or more playback devices to play the first media item corresponding to the first media icon comprises instructing the at least one playback device in the first set of one or more playback devices to transfer at least a portion of a playback queue comprising the first media item to the at least one playback device in the second set of one or more playback devices.

5. The tangible, non-transitory computer-readable media of claim 1, wherein the first section further includes a second media icon corresponding to a second media item, and wherein the second section includes a third zone icon corresponding to a third zone comprising a third set of one or more playback devices, and wherein the method further comprises:
   while the at least one playback device in the second set of one or more playback devices to play the first media item corresponding to the first media icon, and in response to detecting a drag of the second media icon to the third zone icon, instructing at least one playback device in the third set of one or more playback devices to play the second media item corresponding to the second media icon.

6. The tangible, non-transitory computer-readable media of claim 1, wherein the first media item comprises one of (i) an audio track, (ii) a playlist of audio tracks, or (iii) an Internet radio channel.

7. A computing device comprising:
   one or more processors; and
   tangible, non-transitory computer-readable media comprising instructions stored therein, wherein the instructions, when executed cause the computing device to perform functions comprising:
      displaying a graphical user interface comprising a first section and a second section, wherein the first section includes a first media icon corresponding to a first media item, and wherein the second section includes (i) a first zone icon corresponding to a first zone comprising a first set of one or more playback devices and (ii) a second zone icon corresponding to a second zone comprising a second set of one or more playback devices;
      in response to detecting a drag of the first media icon to the first zone icon, instructing at least one playback device in the first set of one or more playback devices to play the first media item corresponding to the first media icon;
      after instructing at least one playback device in the first set of one or more playback devices to play the first media item corresponding to the first media icon, displaying a playback status icon for the first media item in a third section of the graphical user interface; and
      in response to detecting a drag of the playback status icon for the first media item to the second zone icon, instructing at least one playback device in the second set of one or more playback devices to play the first media item corresponding to the first media icon.

8. The computing device of claim 7, wherein instructing at least one playback device in the second set of one or more playback devices to play the first media item corresponding to the first media icon comprises instructing at least one playback device in the second set of one or more playback devices to play the first media icon in synchrony with at least one playback device in the first set of one or more playback devices.

9. The computing device of claim 7, wherein the functions further comprise:
   in response to detecting a drag of the playback status icon for the first media item to the second zone icon, additionally instructing at least one playback device in the first set of one or more playback devices to cease playback of the first media item.

10. The computing device of claim 7, wherein instructing at least one playback device in the second set of one or more playback devices to play the first media item corresponding to the first media icon comprises instructing the at least one playback device in the first set of one or more playback devices to transfer at least a portion of a playback queue comprising the first media item to the at least one playback device in the second set of one or more playback devices.

11. The computing device of claim 7, wherein the first section further includes a second media icon corresponding to a second media item, and wherein the second section includes a third zone icon corresponding to a third zone comprising a third set of one or more playback devices, and wherein the method further comprises:
   while the at least one playback device in the second set of one or more playback devices to play the first media item corresponding to the first media icon, and in response to detecting a drag of the second media icon to the third zone icon, instructing at least one playback device in the third set of one or more playback devices to play the second media item corresponding to the second media icon.

12. The computing device of claim 7, wherein the first media item comprises one of (i) an audio track, (ii) a playlist of audio tracks, or (iii) an Internet radio channel.

13. A method comprising:
   displaying a graphical user interface comprising a first section and a second section, wherein the first section includes a first media icon corresponding to a first media item, and wherein the second section includes (i) a first zone icon corresponding to a first zone comprising a first set of one or more playback devices and (ii) a second zone icon corresponding to a second zone comprising a second set of one or more playback devices;
   in response to detecting a drag of the first media icon to the first zone icon, instructing at least one playback device in the first set of one or more playback devices to play the first media item corresponding to the first media icon;
   after instructing at least one playback device in the first set of one or more playback devices to play the first media item corresponding to the first media icon, displaying a playback status icon for the first media item in a third section of the graphical user interface; and
   in response to detecting a drag of the playback status icon for the first media item to the second zone icon, instructing at least one playback device in the second set of one or more playback devices to play the first media item corresponding to the first media icon.

14. The method of claim 13, wherein the method further comprises:
   in response to detecting a drag of the playback status icon for the first media item to the second zone icon, additionally instructing at least one playback device in the first set of one or more playback devices to cease playback of the first media item.

15. The method of claim 13, wherein the method further comprises:
instructing at least one playback device in the second set of one or more playback devices to play the first media item corresponding to the first media icon in synchrony with at least one playback device in the first set of one or more playback devices.

16. The method of claim 13, wherein the first section further includes a second media icon corresponding to a second media item, and wherein the second section includes a third zone icon corresponding to a third zone comprising a third set of one or more playback devices, and wherein the method further comprises:
while the at least one playback device in the second set of one or more playback devices to play the first media item corresponding to the first media icon, and in response to detecting a drag of the second media icon to the third zone icon, instructing at least one playback device in the third set of one or more playback devices to play the second media item corresponding to the second media icon.

\* \* \* \* \*